(12) United States Patent
Yamamoto et al.

(10) Patent No.: US 11,982,340 B2
(45) Date of Patent: May 14, 2024

(54) TWO-SPEED TRANSMISSION

(71) Applicant: NSK Ltd., Tokyo (JP)

(72) Inventors: Akihiro Yamamoto, Fujisawa (JP); Hirotaka Kishida, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/030,370

(22) PCT Filed: Aug. 27, 2021

(86) PCT No.: PCT/JP2021/031515
§ 371 (c)(1),
(2) Date: Apr. 5, 2023

(87) PCT Pub. No.: WO2022/074958
PCT Pub. Date: Apr. 14, 2022

(65) Prior Publication Data
US 2023/0366451 A1    Nov. 16, 2023

(30) Foreign Application Priority Data

Sep. 10, 2020  (JP) ................................. 2020-171320
Dec. 7, 2020   (JP) ................................. 2020-202936

(51) Int. Cl.
*F16H 3/54*        (2006.01)
(52) U.S. Cl.
CPC ....... *F16H 3/54* (2013.01); *F16H 2200/0034* (2013.01)
(58) Field of Classification Search
CPC ....................................................... F16H 3/54
See application file for complete search history.

(56) References Cited

U.S. PATENT DOCUMENTS 4,649,771 A * 3/1987 Atkinson ................. F16H 3/54
                                              192/53.1
9,067,491 B2 * 6/2015 Tanaka .................... F16H 3/663
(Continued)

FOREIGN PATENT DOCUMENTS

JP    2002-181081 A    6/2002
JP    2011-230697 A   11/2011
JP    2018-515721 A    6/2018

OTHER PUBLICATIONS

International Search Report for PCT/JP2021/031515 dated Oct. 26, 2021.

*Primary Examiner* — Derek D Knight
(74) *Attorney, Agent, or Firm* — Sughrue Mion, PLLC

(57) ABSTRACT

A two-speed transmission includes: an input member; an output member; a rotating member; a first engaging device switching engagement between first and second friction plates to switch the input member and the rotating member to an integrally rotating state or a relatively rotating state; a second engaging device switching the rotating member to a rotatable or non-rotatable state; an elastic biasing means applying a force pressing the first and second friction plates; a pressing device releasing the pressing force; a first bearing between the elastic biasing means and the pressing device; a second bearing between the rotating member and the pressing device or the fixed portion; and a planetary speed reduction mechanism having a sun element connected to the input member or the rotating member, a carrier connected to one of the input member or the rotating member and the output member, and a ring element connected to the other.

10 Claims, 25 Drawing Sheets

(56) References Cited

U.S. PATENT DOCUMENTS

| | | | |
|---|---|---|---|
| 9,200,697 B1 * | 12/2015 | Gauthier | F16H 57/10 |
| 9,228,641 B2 * | 1/2016 | Gauthier | F16H 61/686 |
| 10,208,837 B2 * | 2/2019 | Mordukhovich | B60K 17/08 |
| 2004/0138021 A1 * | 7/2004 | Stettler, Jr. | F16H 3/54 |
| | | | 475/142 |

* cited by examiner

TWO-SPEED TRANSMISSION

CROSS REFERENCE TO RELATED APPLICATIONS

This application is a National Stage of International Application No. PCT/JP2021/031515 filed Aug. 27, 2021, claiming priority based on Japanese Patent Application No. 2020-171320 filed Oct. 9, 2020 and Japanese Patent Application No. 2020-202936 filed Dec. 7, 2020.

TECHNICAL FIELD

The present invention relates to a two-speed transmission capable of switching a speed reduction ratio between an input member and an output member in two stages.

BACKGROUND OF INVENTION

In recent years, with the trend of reducing the consumption of fossil fuels, research into electric vehicles and hybrid vehicles has progressed and is being implemented in some areas. Unlike internal combustion engines (engines) that work by directly burning fossil fuels, electric motors, which are the power source of electric and hybrid vehicles, generally generate maximum torque at start-up, and the torque and rotational speed characteristics of the output shaft are favorable for automobiles, and thus it is not necessary to provide a transmission such as in a general automobile that uses an internal combustion engine as a drive source. However, even in a case where an electric motor is used as a drive source, acceleration performance and high-speed performance can be improved by providing a transmission. More specifically, by providing a transmission, a relationship between the running speed and the acceleration of the vehicle can be made smooth, similar to that of an automobile equipped with an engine and a transmission provided in a power transmission system. This aspect will be described with reference to FIG. 25.

For example, when a power transmission device with a large reduction ratio is arranged between an output shaft of an electric motor and an input portion of a differential gear connected to drive wheels, acceleration (G) and running speed (km/h) of the electric vehicle is conceptually shown as a solid line a in FIG. 25. That is, acceleration performance at low speed is excellent; however, high speed running becomes impossible. On the other hand, when a power transmission device with a small reduction ratio is arranged between the output shaft and the input portion, the relationship becomes like chain line b in FIG. 25. In other words, high-speed running becomes possible; however, the acceleration performance at low speeds is impaired. On the other hand, when a transmission is provided between the output shaft and the input portion, and the reduction ratio of the transmission is changed according to the vehicle speed, a characteristic is obtained in which a portion of the solid line a to the left of a point P and a portion of the chain line b to the right of the point P are connected. This characteristic is mostly the same as that of an engine vehicle with a similar output, as indicated by the dashed line c in FIG. 25, and in terms of acceleration performance and high speed performance, it can be seen that performance equivalent to that of an engine vehicle provided with a transmission in the power transmission system can be obtained.

JP 2018-515721 A discloses a structure of an electric vehicle drive system in which output torque of an electric motor is increased by a two-speed transmission that includes a double-pinion planetary gear mechanism, a clutch (first shift element), and a freewheel (second shift element), and transmitted to an output shaft (axle). This electric vehicle drive device is configured to be able to switch the reduction ratio between the electric motor and the output shaft in two stages, high and low, by switching an internal gear and a carrier of a planetary gear mechanism between a state in which relative rotation is possible and a state in which relative rotation is not possible.

CITATION LIST

Patent Literature

Patent Document 1: JP 2018-515721 A

SUMMARY

Problem to be Solved

The device described in JP 2018-515721 A has room for improvement in terms of improving torque transmission efficiency. In this device, a pressing device presses a clutch part supported by an internal gear and a clutch part supported by a carrier against each other or releases the pressing force, thereby switching between an engaged state and a disengaged state of the clutch. In addition, in this device, a clutch release bearing is provided between the internal gear and the carrier. Therefore, when the clutch part supported by the internal gear and the clutch part supported by the carrier are pressed together by the pressing device in order to bring the planetary gear mechanism into a so-called glued state in which a sun gear, the internal gear, and the carrier rotate together, rolling resistance of the clutch release bearing increases, which may increase torque loss in the clutch release bearing.

In view of the circumstances described above, an object of the present invention is to provide a two-speed transmission having a structure capable of ensuring good torque transmission efficiency.

Solution to Problem

A two-speed transmission according to an aspect of the present invention includes an input member, an output member, a rotating member, a first engaging device, a second engaging device, an elastic biasing means, a pressing device, a first bearing, a second bearing, and a planetary speed reduction mechanism.

The input member is rotatably supported with respect to a fixed portion that does not rotate even during use. Note that the input member is rotationally driven by a drive source such as an electric motor or an engine.

The output member is supported coaxially with the input member and supported so as to rotate relative to the input member. Note that the output member is connected to an input portion of a differential device (differential gear) or the like so as to transmit torque.

The rotating member is supported coaxially with the input member and the output member and supported so as to rotate relative to the input member and the output member.

The first engaging device is provided between the input member and the rotating member, and has a first friction plate and a second friction plate that are supported so as to relatively displace in an axial direction. The first engaging device is configured to switch to a state in which, by pressing the first friction plate and the second friction plate against each other, the input member and the rotating member integrally rotate, and switch to a state in which, by releasing a force of pressing the first friction plate and the second friction plate against each other, the input member and the rotating member rotate relative to each other.

The second engaging device is provided between the fixed portion and the rotating member and is configured to switch between a rotatable state and a non-rotatable state of the rotating member with respect to the fixed portion.

The elastic biasing means is provided between the rotating member and the first engaging device and is configured to apply an elastic bias to the first friction plate and the second friction plate in a direction so as to be pressed against each other.

The pressing device is provided between the fixed portion and the rotating member and is configured to press the elastic biasing means in a direction to release the force pressing the first friction plate and the second friction plate against each other.

The first bearing is provided between the elastic biasing means and the pressing device.

The second bearing is provided between the rotating member and the pressing device or the fixed portion.

The planetary speed reduction mechanism has a sun element, a ring element arranged around the sun element, a carrier arranged between the sun element and the ring element with regard to a radial direction, and planetary elements that engage with the sun element and the ring element so as to transmit torque, and are rotatably supported by the carrier.

In the two-speed transmission according to an aspect of the present invention, the sun element is connected to the input member or the rotating member so as to transmit torque, the carrier is connected to one of the rotating member or the input member and the output member so as to transmit torque, and the ring element is connected to the other of the rotating member or the input member and the output member so as to transmit torque.

In the two-speed transmission according to an aspect of the present invention, in a state in which the rotating member is not rotating with respect to the fixed portion, the pressing device presses the elastic biasing means in the direction to release the force of pressing the first friction plate and the second friction plate against each other.

In the two-speed transmission according to an aspect of the present invention, the elastic biasing means has a pressing plate supported so as to displace in the axial direction with respect to the rotating member, and an elastic member provided between the rotating member and the pressing plate.

The two-speed transmission according to an aspect of the present invention further includes a preload applying means provided between the first bearing and the rotating member and configured to apply a preload in the axial direction to the first bearing.

In the two-speed transmission according to an aspect of the present invention, the sun element is connected to the rotating member so as to transmit torque, the ring element is connected to the input member so as to transmit torque, and the carrier is connected to the output member so as to transmit torque.

In the two-speed transmission according to an aspect of the present invention, the sun element is connected to the input member so as to transmit torque, the ring element is connected to the rotating member so as to transmit torque, and the carrier is connected to the output member so as to transmit torque.

In the two-speed transmission according to an aspect of the present invention, the planetary elements include a first planetary element configured to engage with the sun element so as to transmit torque, and a second planetary element configured to engage with the ring element so as to transmit torque, and to engage with the first planetary element so as to transmit torque.

In this case, the sun element is connected to the rotating member so as to transmit torque, the ring element is connected to the output member so as to transmit torque, and the carrier is connected to the input member so as to transmit torque.

Alternatively, the sun element is connected to the input member so as to transmit torque, the ring element is connected to the output member so as to transmit torque, and the carrier is connected to the rotating member so as to transmit torque.

In the two-speed transmission according to an aspect of the present invention, the sun element is configured by a sun gear, the ring element is configured by a ring gear, and the planetary elements are configured by planetary gears. That is, the planetary speed reduction mechanism is configured by a planetary gear mechanism.

Alternatively, the sun element may be configured by a sun roller, the ring element may be configured by a ring roller, and the planetary elements may be configured by planetary rollers. That is, the planetary speed reduction mechanism may be configured by a friction roller mechanism.

The second engaging device may be configured by a dog clutch, a friction clutch, a one-way clutch including a freewheel, or the like.

The pressing device may include a cam device, a hydraulic cylinder device, or the like.

The first bearing may be configured by a thrust rolling bearing. More specifically, the thrust rolling bearing may be configured by a thrust ball bearing, a thrust needle bearing, a thrust cylindrical roller bearing, a thrust tapered roller bearing, a thrust angular contact ball bearing, or the like.

The second bearing may be configured by, for example, a thrust rolling bearing or a radial rolling bearing capable of supporting a thrust load. More specifically, the thrust rolling bearing may be configured by a thrust ball bearing, a thrust needle bearing, a thrust cylindrical roller bearing, a thrust tapered roller bearing, a thrust angular contact ball bearing, or the like. The radial rolling bearing may be configured by a radial ball bearing, a radial tapered roller bearing, a radial angular contact ball bearing, or the like.

Advantageous Effect

With the two-speed transmission of one aspect of the present invention, it is possible to ensure good torque transmission efficiency.

BRIEF DESCRIPTIONS OF THE DRAWINGS

DESCRIPTION OF EMBODIMENTS

First Example

Figure 1:
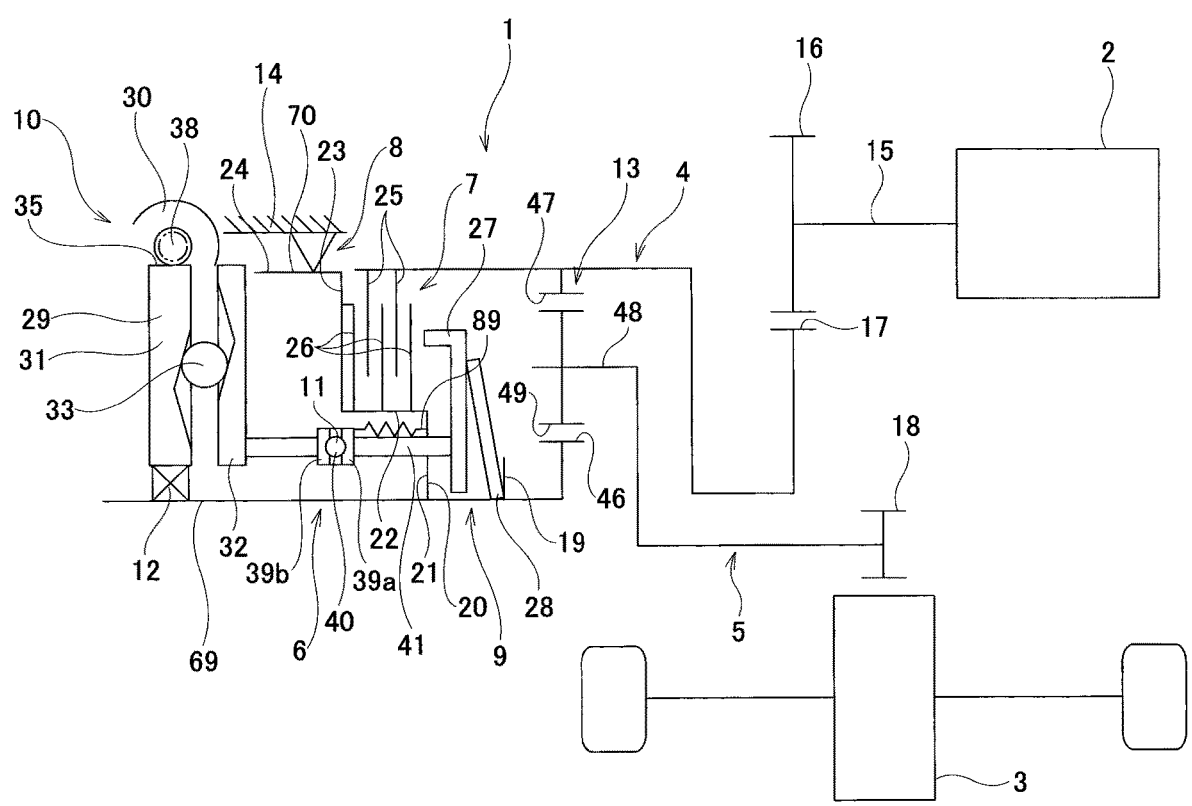
FIG. 1 is a schematic cross-sectional view of a drive system incorporating a two-speed transmission of a first example of an embodiment of the present invention.

A first example of an embodiment of the present invention will be described with reference to FIG. 1 to FIG. 13B. The two-speed transmission 1 of this example is arranged between a drive source 2 such as an electric motor or an engine and a differential device 3, and transmits an output torque of the drive source 2 to the differential device 3 while increasing (decelerating) the output torque, or as is without increasing the output torque. The two-speed transmission 1 includes an input member 4, an output member 5, a rotating member 6, a first engaging device 7, a second engaging device 8, an elastic biasing means 9, a pressing device 10, a first bearing 11, a second bearing 12, and a planetary speed reduction mechanism 13.

The input member 4 is rotatably supported by a rolling bearing (not illustrated) or the like with respect to a fixed portion 14 that does not rotate even during use and is configured by a housing or the like that houses the two-speed transmission 1. In the present example, the input member 4 is cylindrical (hollow). In addition, the input member 4, at an end portion on one side in the axial direction (right side in FIG. 1), has an input gear 17 that engages with a drive gear 16 provided on an output shaft 15 of the drive source 2. That is, the input member 4 can be rotationally driven by the drive source 2.

The output member 5 is supported coaxially with the input member 4 and so as to rotate relative to the input member 4. In this example, the output member 5 is supported at an inner side in the radial direction of the cylindrical input member 4 so as to rotate relative to the input member 4 through a rolling bearing (not illustrated). The output member 5 also has an output gear 18 at an end portion on the one side in the axial direction. The output gear 18 engages with a gear provided at an input portion of the differential device 3. That is, the output member 5 is connected to the input portion of the differential device 3 so as to transmit torque.

The rotating member 6 is supported coaxially with the input member 4 and the output member 5 and so as to rotate relative to the input member 4 and the output member 5. In this example, the rotating member 6 is rotatably supported with respect to the fixed portion 14 through a second engaging device 8, a pressing device 10, and a second bearing 12, which will be described later.

In this example, the rotating member 6 has a small-diameter flange portion 19 protruding outward in the radial direction at an intermediate portion in the axial direction thereof, and has a flange portion 20 protruding outward in the radial direction at a portion located further on the other side in the axial direction (left side in FIG. 1) than the small-diameter flange portion 19. The flange portion 20 has a first circular ring portion 21 having a hollow circular plate shape and having partial arc-shaped through holes 64 at a plurality of locations at intermediate portions in the radial direction for inserting a pressing member 41 (described later); a first cylindrical portion 22 bent toward the other side in the axial direction from an end portion on the outer side in the radial direction of the first circular ring portion 21; a second circular ring portion 23 having a hollow circular plate shape that is bent outward in the radial direction from an end portion on the other side in the axial direction of the first cylindrical portion 22; and a second cylindrical portion 24 bent toward the other side in the axial direction from an end portion on the outer side in the radial direction of the second circular ring portion 23.

Figure 13A:
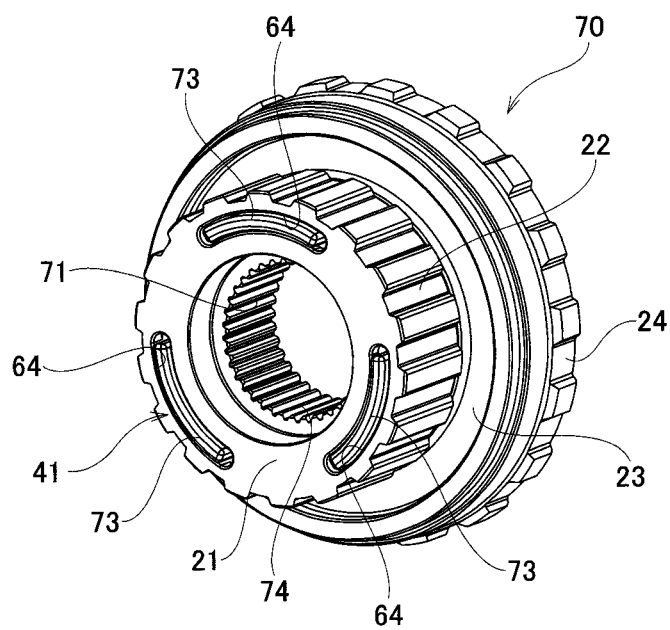
FIG. 13A is a perspective view of a flange portion and a pressing member of a rotating member of the two-speed transmission of the first example.
Figure 13B:
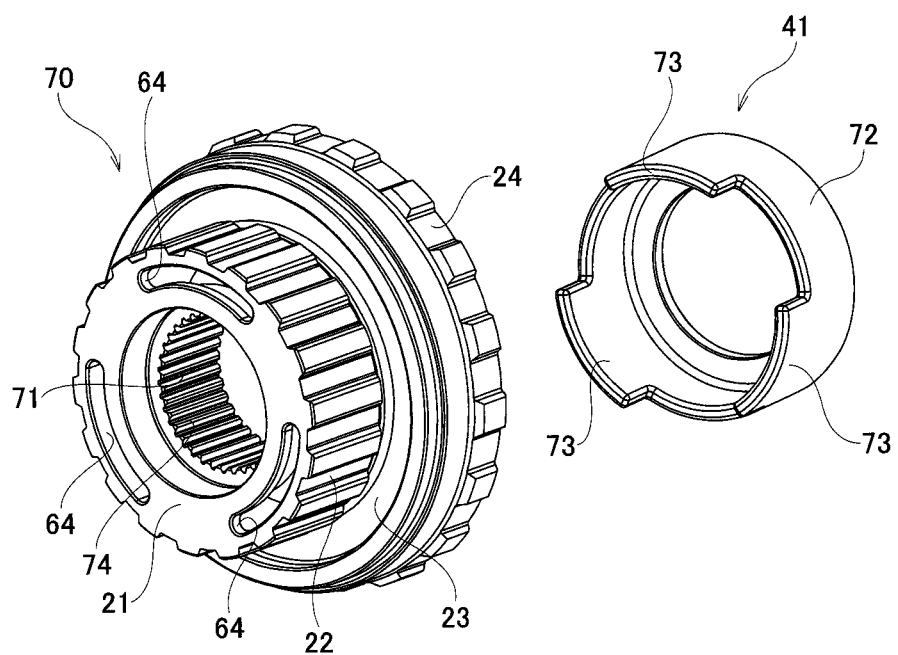
FIG. 13B is an exploded perspective view of the flange portion and the pressing member.
Figure 14:
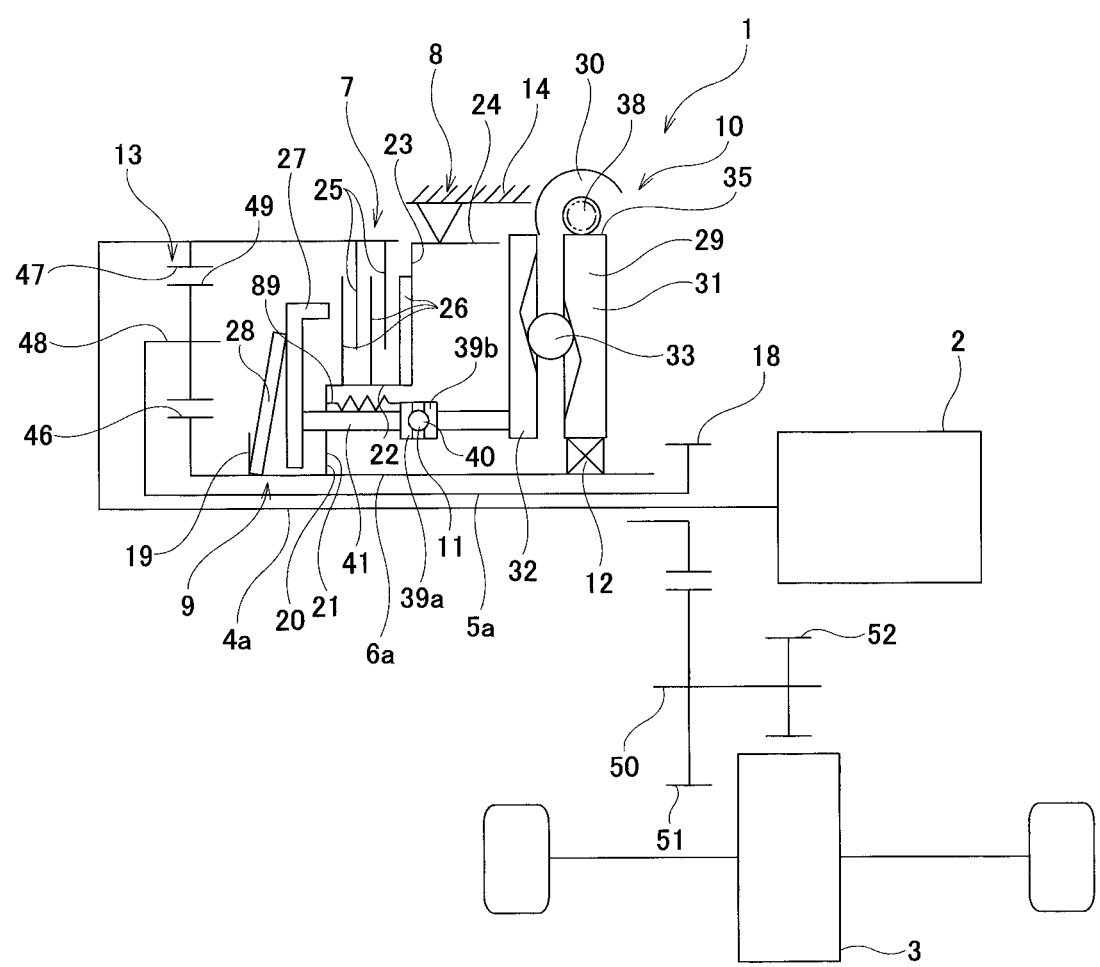
FIG. 14 is a schematic cross-sectional view of a drive system incorporating a two-speed transmission of a second example of an embodiment of the present invention.

In the present example, the rotating member 6 having the flange portion 20 is configured by externally fitting and fixing a stepped cylindrical member 70 as illustrated on the left side of FIG. 13B to a shaft member 69 having the small-diameter flange portion 19. That is, the stepped cylindrical member 70 has a hollow circular plate shape, and has the first circular ring portion 21 having the through holes 64, the first cylindrical portion 22, the second circular ring portion 23, the second cylindrical portion 24, and a small-diameter cylindrical portion 74 bent from an inner end portion on an inner side in the radial direction of the first circular ring portion 21 toward the other side in the axial direction. A female spline portion 71 provided on an inner peripheral surface of the small-diameter cylindrical portion 74 of the rotating member 6 is engaged with a spline engagement with a male spline portion provided on an outer peripheral surface of the shaft member 69.

The first engaging device 7 has first friction plates 25 and second friction plates 26 supported so as to be relatively displaceable in the axial direction, and is provided between the input member 4 and the rotating member 6. That is, the first engaging device 7 includes a multi-plate clutch in which the first friction plates 25 supported by the input member 4 and the second friction plates 26 supported by the rotating member 6 are alternately superimposed. The first engaging device 7 is able to switch between a state in which the first friction plates 25 and the second friction plates 26 are pressed against each other and connected, and the input member 4 and the rotating member 6 rotate together, and a state in which the first friction plates 25 and the second friction plates 26 are released and disconnected, and the input member 4 and the rotating member 6 rotate relative to each other.

In this example, the first friction plates 25 are supported by an inner peripheral surface at the other end in the axial direction of the input member 4 so as to displace in the axial direction. Of the second friction plates 26, the second friction plate 26 located the furthest on the other side in the axial direction is supported by an outer peripheral surface of the first cylindrical portion 22 of the rotating member 6 so as not to displace in the axial direction, and the other second friction plates 26 are supported on the outer peripheral surface of the first cylindrical portion 22 so as to displace in the axial direction.

A second engaging device 8 is provided between the fixed portion 14 and the rotating member 6 and switches between a state in which the rotating member 6 is able to rotate with respect to the fixed portion 14 and a state in which the rotating member 6 is not able to rotate. In this example, the second engaging device 8 is provided between an inner peripheral surface of the fixed portion 14 and the second cylindrical portion 24 of the rotating member 6.

The second engaging device 8 can be composed of, for example, a dog or friction clutch (braking device) capable of switching between the engaged and disengaged states by an actuator. The actuator for switching between the engaged and disengaged states of the clutch is not particularly limited, and a hydraulic actuator, an electromagnetic actuator, or the like can be used. As will be described later, the second engaging device 8 is disconnected in a low reduction ratio mode in which the first engaging device 7 is connected, and is connected in a high reduction ratio mode in which the first engaging device 7 is disconnected.

Figure 4:
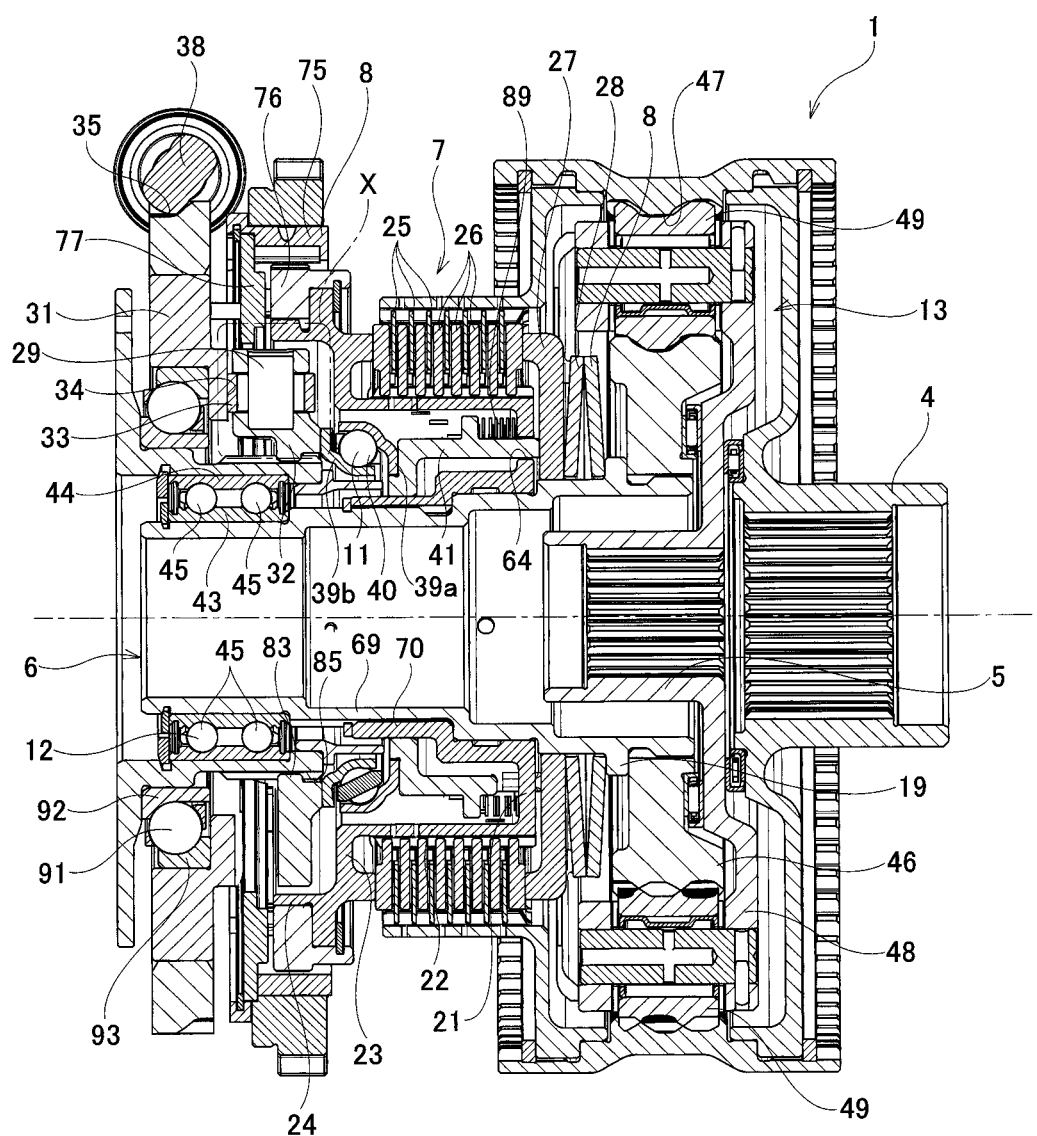
FIG. 4 is a cross-sectional view of the two-speed transmission of the first example.
Figure 6:
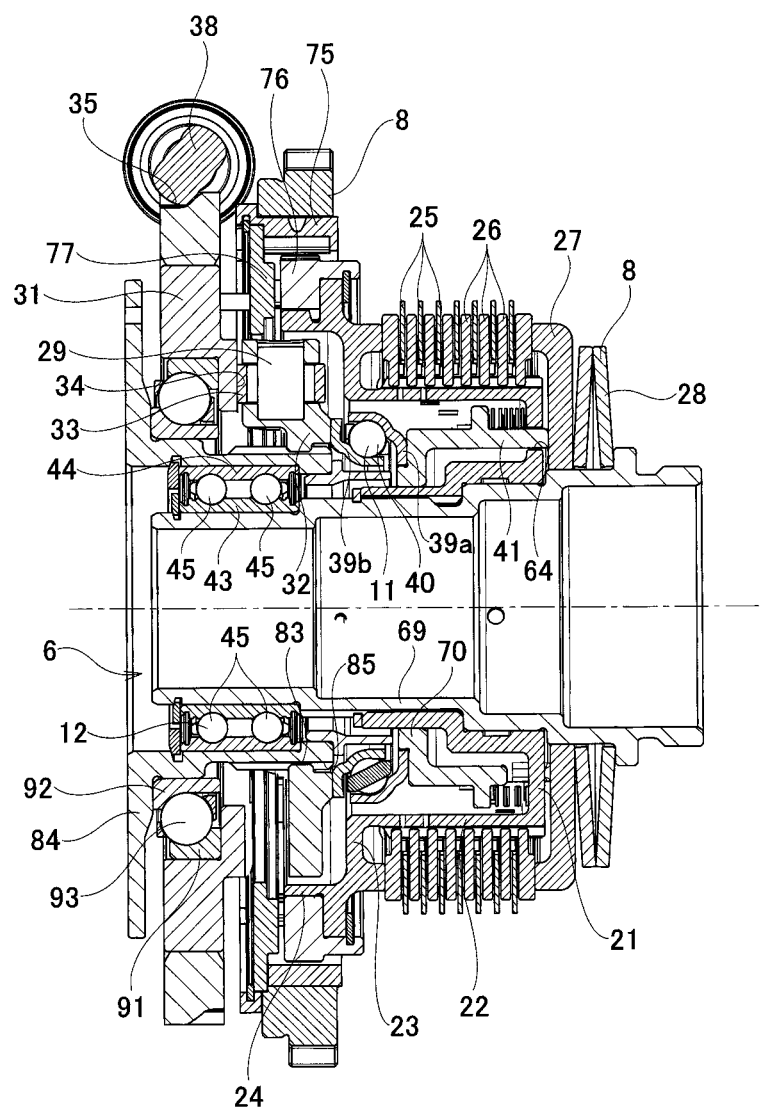
FIG. 6 is a cross-sectional view of the two-speed transmission illustrated in FIG. 5.
Figure 7:
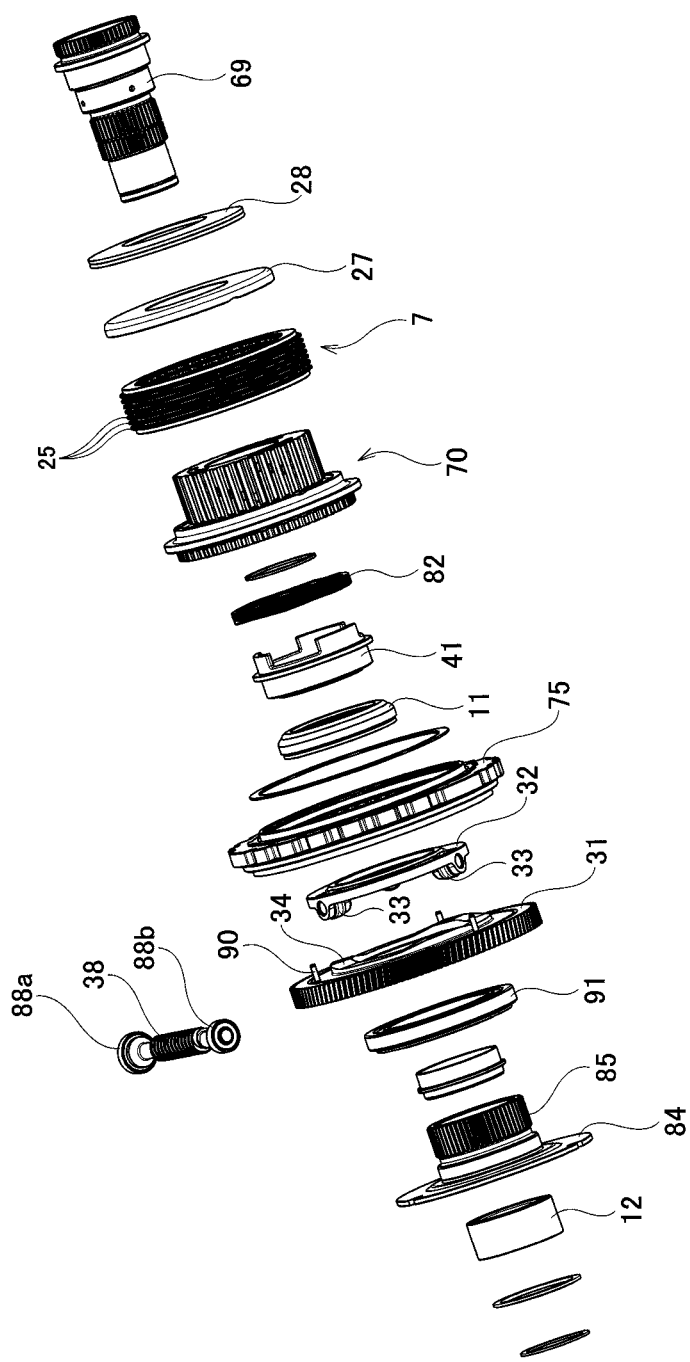
FIG. 7 is an exploded perspective view of the two-speed transmission illustrated in FIG. 5.
Figure 8:
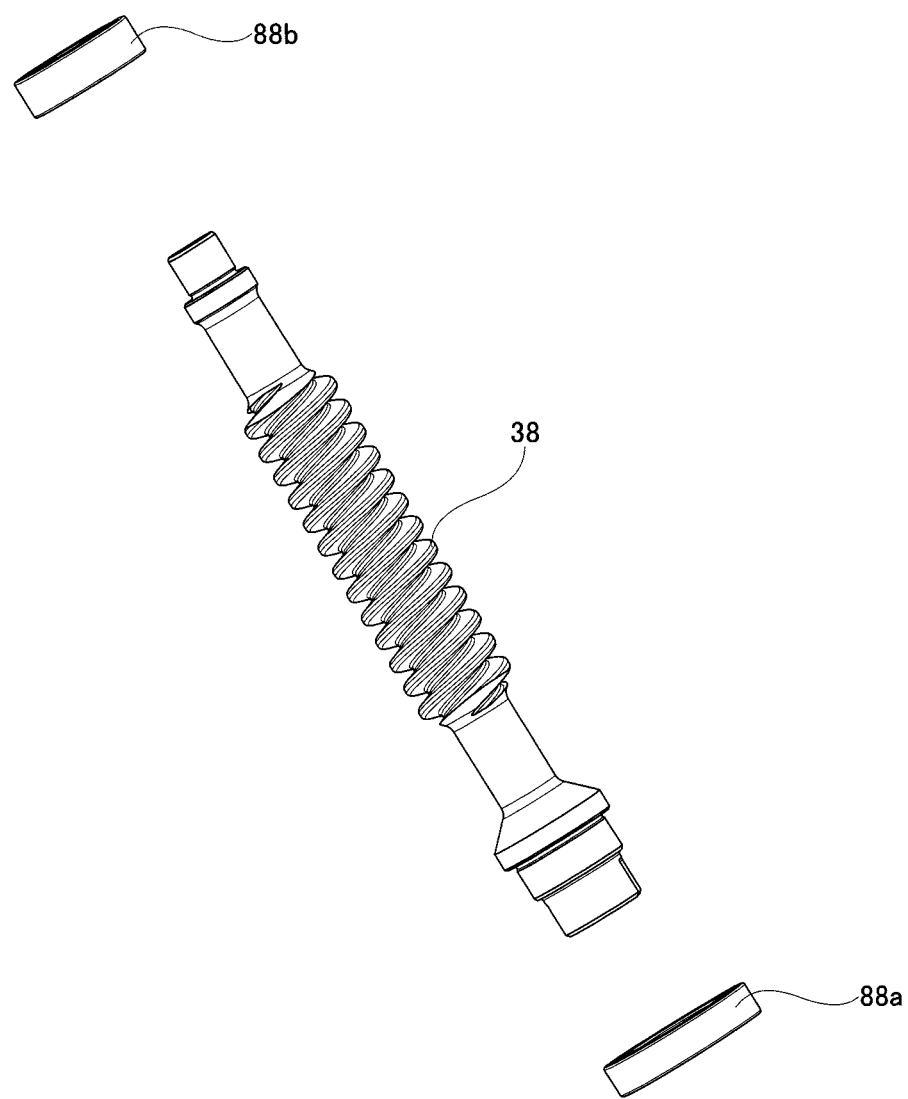
FIG. 8 is a perspective view illustrating a state before installing a worm and a pair of support bearings of the two-speed transmission of the first example.
Figure 9:
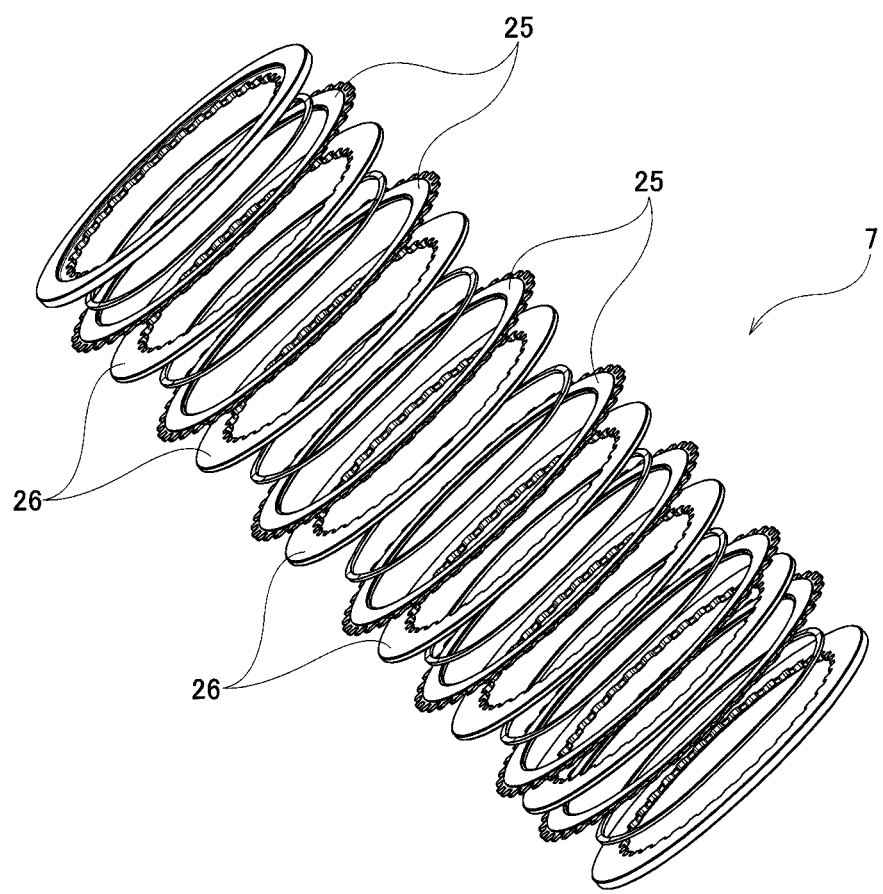
FIG. 9 is an exploded perspective view of a first engaging device of the two-speed transmission of the first example.

In this example, as illustrated in FIGS. 4 and 6, the second engaging device 8 includes an outer-diameter side cylindrical member 75, an inner-diameter side cylindrical member 76, at least one engaging pin (not illustrated), and a selection plate 77.

Figure 3:
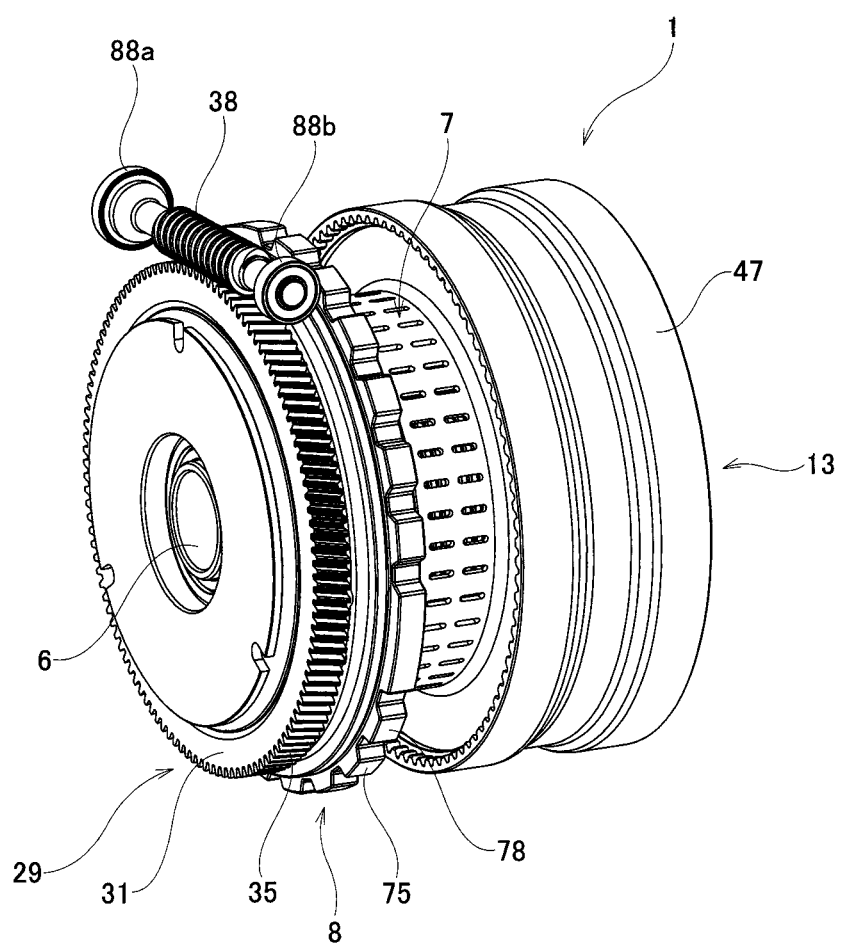
FIG. 3 is a perspective view of the two-speed transmission of the first example.
Figure 5:
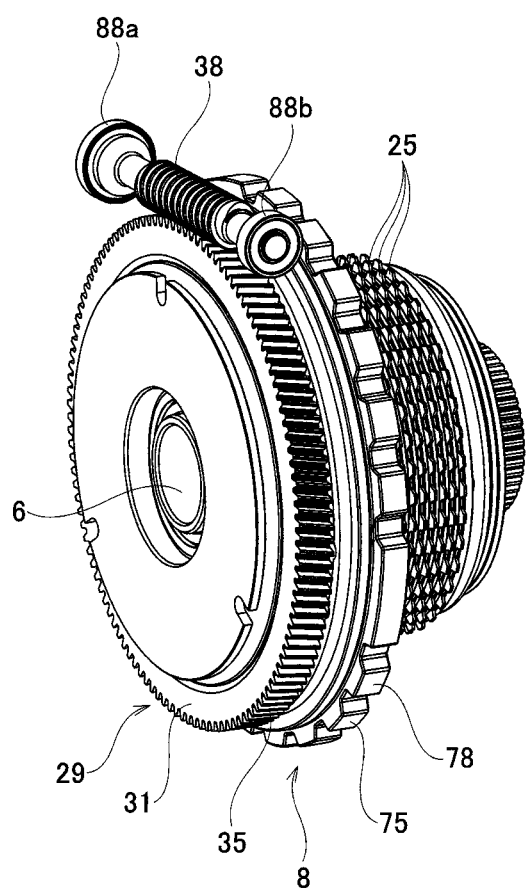
FIG. 5 is a perspective view of illustrating the two-speed transmission of the first example with the planetary gear mechanism removed.

As illustrated in FIGS. 3 and 5, the outer-diameter side cylindrical member 75 has, on an outer peripheral surface thereof, an outer peripheral side concave-convex portion 78 in which concave portions and convex portions are alternately arranged in the circumferential direction. The outer-diameter side cylindrical member 75, by the outer peripheral side concave-convex portion 78 engaging with an inner peripheral concave-convex portion provided on an inner peripheral surface of the fixed portion 14, is supported so as not to rotate relative to the fixed portion 14.

The inner-diameter side cylindrical member 76 is externally fitted and fixed to the second cylindrical portion 24 of the rotating member 6 so as not to relatively rotate.

The engaging pin is extended between the outer-diameter side cylindrical member 75 and the inner-diameter side cylindrical member 76 so as to be removable. In this example, the engaging pin protrudes inward in the radial direction from an inner peripheral surface of the outer-diameter side cylindrical member 75 and is supported in a state of being elastically pressed inward in the radial direction. In addition, the inner-diameter side cylindrical member 76 has an engaging concave portion on an outer peripheral surface thereof with which a tip-end portion of the engaging pin is able to engage.

The selection plate 77 has a mode selection portion, which is a concave-convex portion with regard to the circumferential direction, and is capable of being rotatably driven by an electric motor 30 to be described later through a drive cam 31.

Based on the rotation of the selection plate 77, the second engaging device 8 switches between a state in which the outer-diameter side cylindrical member 75 and the inner-diameter side cylindrical member 76 are relatively rotatable and a state in which they are not relatively rotatable. That is, based on the rotation of the selection plate 77, engagement between the engaging pin and an engaging concave portion is released by a convex portion of the mode selection portion pressing the engaging pin outward in the radial direction. This allows the inner-diameter side cylindrical member 76 to rotate with respect to the outer-diameter side cylindrical member 75, which allows the rotating member 6 to rotate with respect to the fixed portion 14. On the other hand, based on the rotation of the selection plate 77, the engaging pin is engaged with the engaging concave portion by moving the convex portion of the mode selection portion to a position separated in the circumferential direction from the tip-end portion of the engaging pin. This prevents rotation of the inner-diameter side cylindrical member 76 with respect to the outer-diameter side cylindrical member 75, which prevents rotation of the rotating member 6 with respect to the fixed portion 14.

The elastic biasing means 9 is provided between the rotating member 6 and the first engaging device 7, and elastically applies a bias to the first friction plates 25 and the second friction plates 26 in a direction so as to be pressed against each other. In the present example, the elastic biasing means 9 has a pressing plate 27 and an elastic member 28.

In the present example, the pressing plate 27 is configured into a hollow circular plate shape, and is supported around a portion of the rotating member 6 between the small-diameter flange portion 19 and the flange portion 20 so as to displace in the axial direction with respect to the rotating member 6. In addition, in the pressing plate 27, an end surface on the other side in the axial direction of an outer portion in the radial direction is made to face a surface on the one side in the axial direction of the second friction plate 26 of the second friction plates 26 that is located the furthest on the one side in the axial direction.

In the present example, the elastic member 28 is sandwiched in an elastically compressed state between a surface on the other side in the axial direction of the small-diameter flange portion 19 of the rotating member 6 and a surface on the one side in the axial direction of the pressing plate 27. That is, the elastic biasing means 9 elastically presses the first friction plates 25 and the second friction plates 26 in a direction so as to be pressed against each other by pressing, via the pressing plate 27, the second friction plate 26 that is the furthest on the one side in the axial direction toward the other side in the axial direction by a force that elastically restores the elastic member 28. The elastic member 28 can be configured by a disk spring, a torsion coil spring, or the like.

The pressing device 10 is provided between the fixed portion 14 and the rotating member 6, and presses the elastic biasing means 9 in a direction that releases the force pressing the first friction plates 25 and the second friction plates 26 against each other. In this example, the pressing device 10 has a cam device 29 and an electric motor 30.

Figure 10:
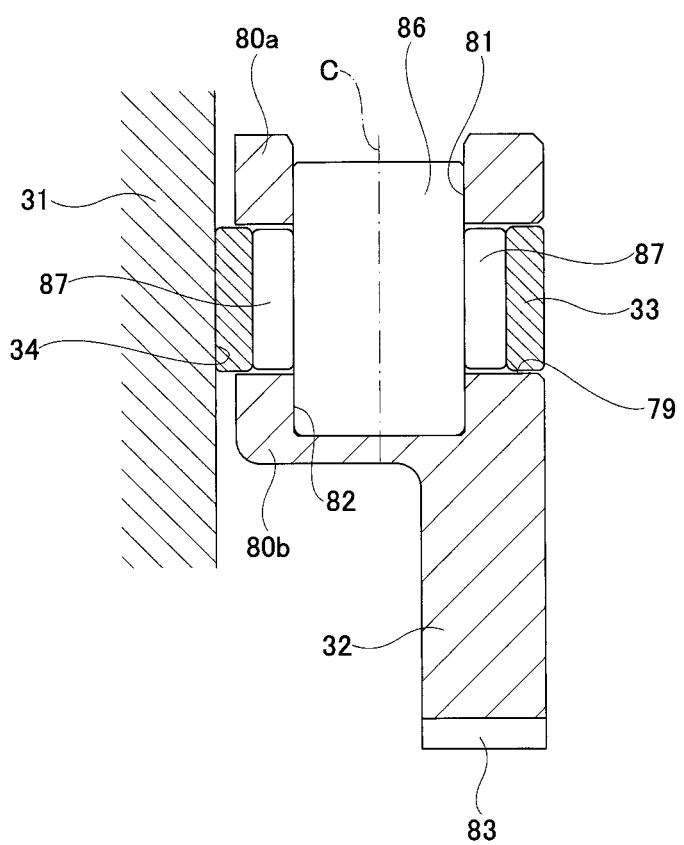
FIG. 10 is an enlarged view of the portion X of FIG. 4.

The cam device 29 has a drive cam 31, a driven cam 32 and rolling elements 33. In the present example, as illustrated in FIG. 10, rollers are used as the rolling elements 33, and the rolling elements 33 are supported with respect to the driven cam 32 so as to freely rotate about a rotation axis oriented in the radial direction centered on the central axis of the driven cam 32. Note that FIG. 1 to FIG. 2B schematically illustrate the cam device 29 in order to facilitate understanding of the invention.

Figure 11:
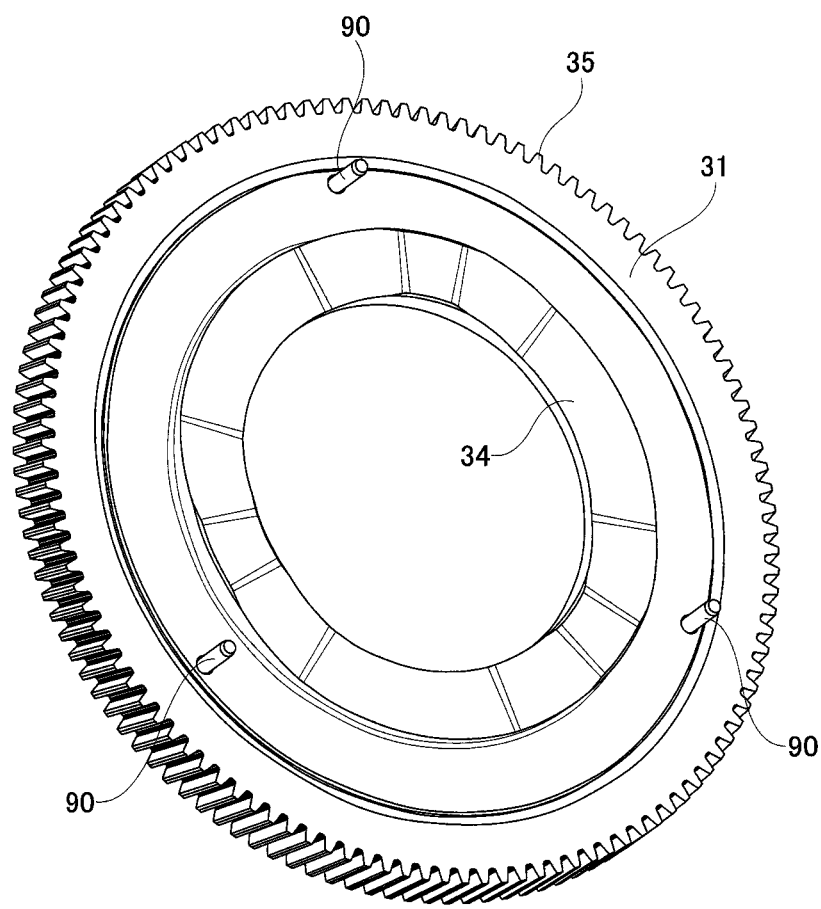
FIG. 11 is a perspective view of a drive cam of the two-speed transmission of the first example.

As illustrated in FIG. 11, the drive cam 31 has a drive cam surface 34 in which the same number of concave portions and convex portions are alternately arranged in the circumferential direction at an inner portion in the radial direction of a surface on the one side in the axial direction, and has wheel teeth 35, forming a helical gear, on an outer peripheral surface thereof. The drive cam 31 is supported by an angular ball bearing 91 (described later), a tubular member 84, and the second bearing 12 so as to rotate relative to the rotating member 6. In addition, the drive cam 31 has pin portions 90 protruding toward the one side in the axial direction at a plurality of locations (three locations in the illustrated example) in the circumferential direction of an intermediate portion in the radial direction of a surface on the one side in the axial direction. The tip-end portions of the pin portions 90 are engaged (internally fitted without looseness) in engaging holes provided in the selection plate 77. As a result, the drive cam 31 and the selection plate 77 rotate integrally (at the same speed in the same direction).

Figure 12:
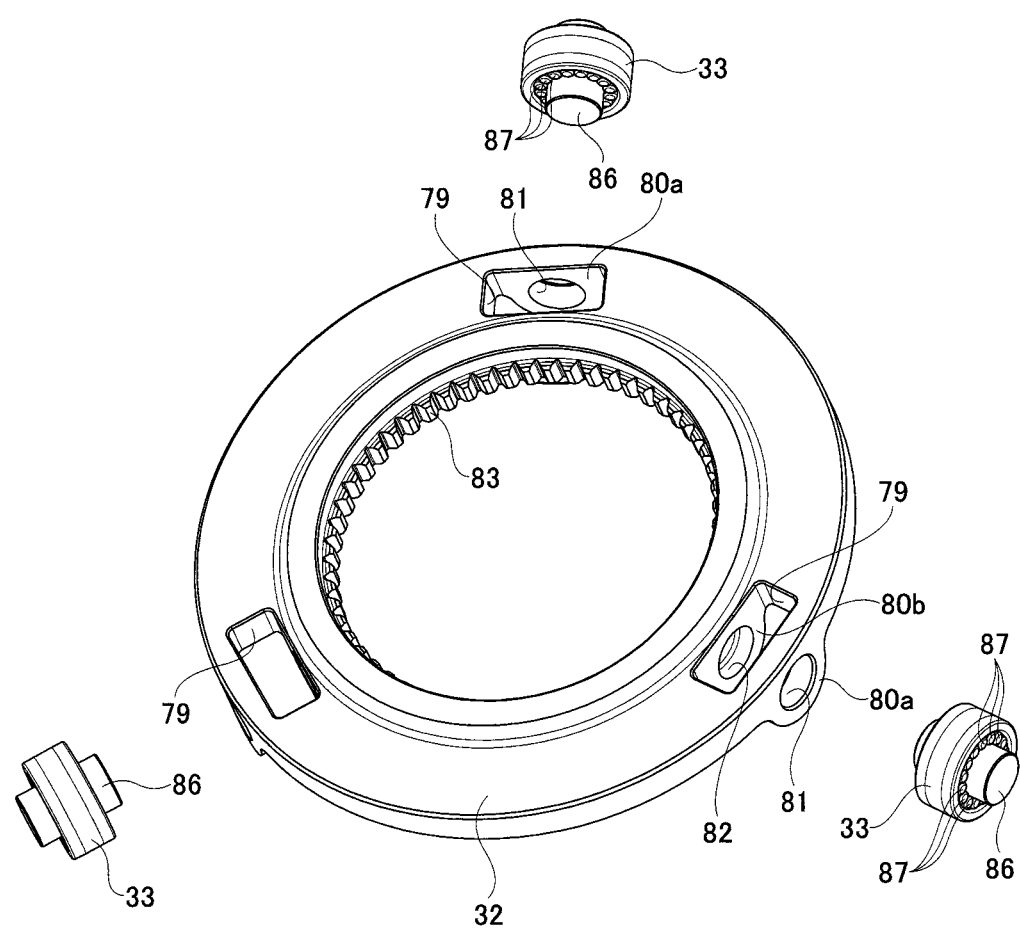
FIG. 12 is a perspective view of a driven cam and rolling elements of the two-speed transmission of the first example.

As illustrated in FIG. 12, the driven cam 32 is configured into a hollow circular plate shape, has rectangular holes 79 passing through in the axial direction at a plurality of locations (three locations in the illustrated example) in the circumferential direction of an intermediate portion in the radial direction, and has substantially semicircular plate-like support plate portions 80a and 80b projecting toward the one side in the axial direction from portions on both sides in the radial direction of each of the rectangular holes 79. Each of the support plate portions 80a on the outer side in the radial direction includes a support hole 81, which is a circular hole penetrating in the radial direction, and each of the support plate portions 80b on the inner side in the radial direction includes a support concave portion 82 having a circular opening on the outer side surface in the radial direction. The driven cam 32 is arranged around the rotating member 6 so as to displace in only the axial direction. More specifically, by engaging with a spline engagement a female spline portion 83 provided on the inner peripheral surface with a male spline portion 85 provided on the outer peripheral surface of the tubular member 84 that is supported by and fixed to the fixed portion 14, the driven cam 32 is supported so as to displace in the axial direction with respect to the fixed portion 14.

Each of the rolling elements 33 has a cylindrical shape and is rotatably supported by the support plate portions 80a and 80b through a columnar support shaft 86 and rollers 87. That is, an end portion on the one side in the axial direction of the support shaft 86 (end portion on the outer side in the radial direction centered on the central axis of the driven cam 32) is internally fitted and fixed in the support hole 81 of the support plate portion 80a on the outer side in the radial direction, and an end portion on the other side in the axial direction of the support shaft 86 (end portion on the inner side in the radial direction centered on the central axis of the driven cam 32) is internally fitted and fixed in the support concave portion 82 of the support plate portion 80b on the inner side in the radial direction. The rollers 87 are rotatably sandwiched between the inner peripheral surface of the rolling element 33 and the outer peripheral surface of an intermediate portion in the axial direction of the support shaft 86. As a result, the rolling elements 33 are supported by the driven cam 32 so as to freely rotate about the rotation axis C extending in the radial direction centered on the central axis of the driven cam 32.

As illustrated in FIG. 10, in a state in which the rolling elements 33 are supported by the driven cam 32, the portions of the rolling elements 33 other than the portions on the other side in the axial direction of the driven cam 32 are inside the rectangular holes 79. In addition, the outer peripheral surface of each rolling element 33, on the other side in the axial direction of the driven cam 32, is in rolling contact with a driving cam surface 34 provided on the surface on the one side in the axial direction of the driving cam 31.

In the cam device 29, as the drive cam 31 rotates, the amount that the rolling elements 33 ride up over bottom portions of the concave portions of the driving cam surface 34 increases or decreases, whereby the driven cam 32 displaces in the axial direction.

Alternatively, the rolling elements 33 can also be balls. In this case, in addition to the drive cam surface 34 or instead of the drive cam surface 34, on the surface on the other side in the axial direction of the driven cam 32, a driven cam surface is formed in which the same number of concave portions and convex portions are alternately arranged in the circumferential direction.

A worm 38 connected to an output shaft of the electric motor 30 is engaged with the wheel teeth 35 provided on the outer peripheral surface of the drive cam 31. As a result, the electric motor 30 is able to rotate and drive the drive cam 31. The worm 38 is rotatably supported with respect to the fixed portion 14 by a pair of support bearings 88a, 88b. In this example, the screw-shaped worm 38 and the wheel teeth 35, which is a helical gear, are engaged; however, the electric motor is also able to rotate and drive the drive cam by engaging a spur gear or bevel gear provided on the output shaft of the electric motor with a spur gear or bevel gear provided on the drive cam, or by extending a belt or chain between the output shaft of the electric motor and the drive cam, or the like.

The first bearing 11 is provided between the elastic biasing means 9 and the pressing device 10. The first bearing 11 has a pair of bearing rings 39a, 39b and rolling elements 40 arranged therebetween so as to freely roll. More specifically, the first bearing 11 is provided between the cylindrical pressing member 41 that is connected to the pressing plate 27 of the elastic biasing means 9 and the driven cam 32 of the pressing device 10. As illustrated in FIG. 13B, the pressing member 41 has a cylindrical base portion 72 and a partial cylindrical portion 73 protruding toward the one side in the axial direction from a plurality of locations (three locations in the illustrated example) in the circumferential direction of an end portion on the one side in the axial direction of the base portion 72. In this example, the bearing ring 39a on the one side in the axial direction is supported by and fixed to an end portion on the other side in the axial direction of the base portion 72, and a tip-end portion (the end portion on the one side in the axial direction) of the partial cylindrical portion 73 is made to face an intermediate portion in the radial direction of the surface on the other side in the axial direction of the pressing plate 27.

In the illustrated example, the first bearing 11 is configured by a single-row thrust ball bearing that uses balls as the rolling elements 40. However, in a case of implementing the present invention, the first bearing 11 may alternatively be a thrust rolling bearing such as a thrust angular ball bearing, a thrust needle bearing, a thrust roller bearing, or a thrust tapered roller bearing. In addition, the thrust bearing applied to the first bearing 11 can also be configured by a bearing unit in which a plurality of bearings are combined.

The second bearing 12 is provided between the rotating member 6 and the pressing device 10. In this example, the second bearing 12, the tubular member 84, and the angular ball bearing 91 are provided between the rotating member 6 and the drive cam 31 of the pressing device 10. The second bearing 12 is configured by a double-row ball bearing, and includes an inner ring 43 externally fitted and fixed to the rotating member 6, an outer ring 44 internally fitted and fixed to the tubular member 84, and rolling elements 45 that are arranged between the inner ring 43 and the outer ring 44 so as to freely roll. The angular ball bearing 91 includes an inner ring 92 externally fitted and fixed to the tubular member 84, an outer ring 93 internally fitted and fixed to the drive cam 31, and rolling elements 94 that are arranged between the inner ring 92 and the outer ring 93 so as to freely roll. Note that in FIG. 1, the tubular member 84 and the angular ball bearing 91 are omitted.

In the illustrated example, the second bearing 12 is a single row deep groove ball bearing that uses balls as the rolling elements 45. However, in a case of implementing the present invention, the configuration of the second bearing 12 is not particularly limited as long as it enables relative rotation between the rotating member and the pressing device and can support the biasing force in the axial direction of the elastic biasing means. Alternatively, as the second bearing 12, a radial rolling bearing capable of supporting a thrust load, such as a deep groove ball bearing, a radial angular contact ball bearing, or a radial tapered roller bearing, can be used. In addition, as the second bearing 12, a thrust rolling bearing such as a thrust ball bearing, a thrust needle bearing, a thrust roller bearing, a thrust tapered roller bearing, or a thrust angular contact ball bearing can be used.

Furthermore, the second bearing 12 can also be configured by a bearing unit in which a plurality of bearings are combined.

In a case of implementing the present invention, it is also possible to support and fix a member (for example, a drive cam) of the pressing device to one of the pair of bearing rings (for example, the outer ring) of the second bearing, and to support and fix the rotating member to the other bearing ring (for example, the inner ring).

The planetary speed reduction mechanism 13 has a sun gear 46 as a sun element, a ring gear 47 as a ring element, a carrier 48 as a carrier element, and planetary gears 49 as planetary elements. That is, in this example, the planetary speed reduction mechanism 13 is configured by a single pinion type planetary gear mechanism.

The sun gear 46 is connected to the rotating member 6 so as to transmit torque. In this example, the sun gear 46 is provided at an end portion on the one side in the axial direction of the rotating member 6.

The ring gear 47 is arranged around the sun gear 46 so as to be coaxial with the sun gear 46, and is connected to the input member 4 so as to transmit torque. In the present example, the ring gear 47 is provided at an intermediate portion in the axial direction of the input member 4.

The carrier 48 is arranged between the sun gear 46 and the ring gear 47 in the radial direction so as to be coaxial with the sun gear 46 and the ring gear 47, and is connected to the output member 5 so as to transmit torque.

Each of the planetary gears 49 engages with the sun gear 46 and the ring gear 47, and is supported by the carrier 48 so as to be rotate on its own central axis.

The two-speed transmission 1 of the present example further includes a preload applying means 89 which is provided between the first bearing 11 and the rotating member 6 and which applies a preload in the axial direction to the first bearing 11, which is a thrust bearing. In this example, the preload applying means 89 is sandwiched in an elastically compressed state between a surface on the one side in the axial direction of the bearing ring 39a on the one side in the axial direction of the pair of bearing rings 39a, 39b of the first bearing 11 and a surface on the other side in the axial direction of the first circular ring portion 21 of the flange portion 20 of the rotating member 6. As a result, as illustrated in FIG. 2B, even in a state in which the pressing plate 27 is pressed toward the one side in the axial direction against the elastic force of the elastic member 28, a preload is applied to the first bearing 11, and the first bearing 11 is prevented from falling out from between the elastic biasing means 9 and the pressing device 10.

The two-speed transmission of the present example, by switching the connected state and the disconnected state of the first engaging device 7 and the connected state and the disconnected state of the second engaging device 8, is able to switch between a low reduction ratio mode in which the reduction ratio between the input member 4 and the output member 5 is small (the reduction ratio is 1) and a high reduction ratio mode in which the reduction ratio is larger than in the low reduction ratio mode. Each case will be described below.

<Low Reduction Ratio Mode>

To switch the two-speed transmission 1 to the low reduction ratio mode, the first engaging device 7 is connected and the second engaging device 8 is disconnected.

Figure 2A:
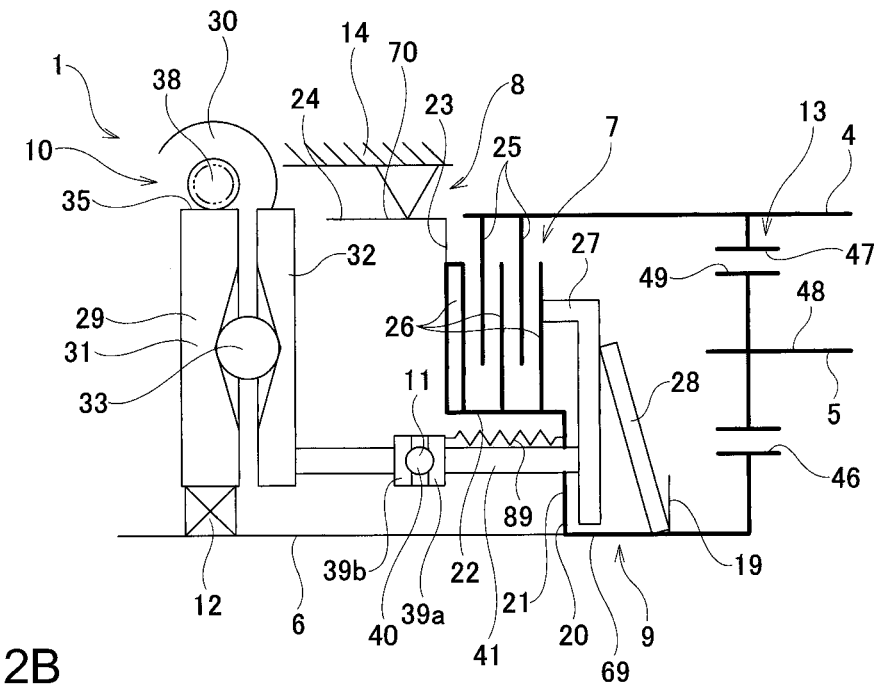
FIG. 2A is a schematic cross-sectional view illustrating a torque transmission path in a low reduction ratio mode of the two-speed transmission of the first example.
Figure 2B:
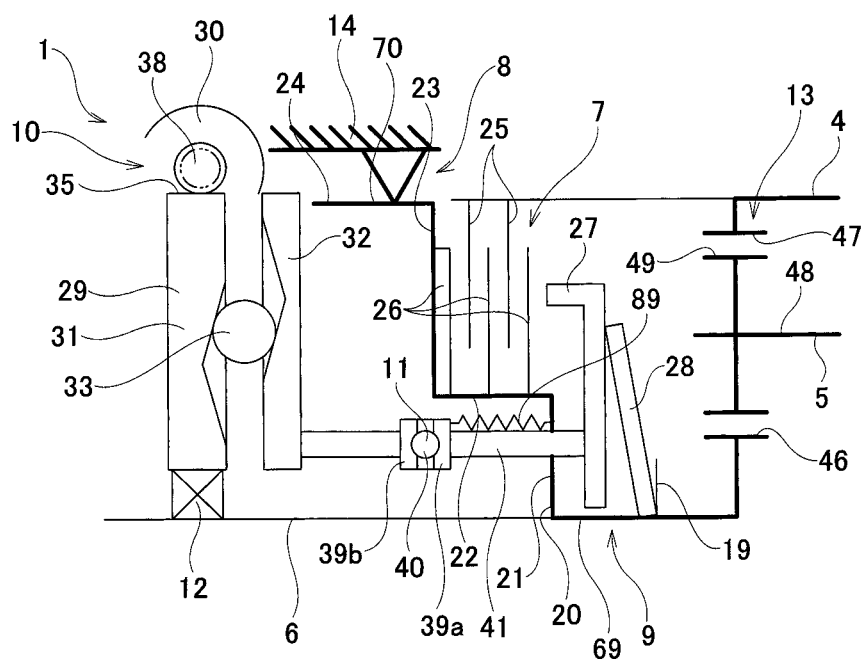
FIG. 2B is a schematic cross-sectional view illustrating a torque transmission path in a high reduction ratio mode of the two-speed transmission of the first example.

More specifically, as illustrated in FIG. 2A, the electric motor 30 rotates and drives the drive cam 31 in a direction in which the amount that the rolling elements 33 ride up over the bottom portions of the concave portions of the drive cam surface 34 decreases. As a result, the driven cam 32 releases the force pressing the pressing plate 27 toward the one side in the axial direction through the first bearing 11 and the pressing member 41. When the force pressing the pressing plate 27 toward the one side in the axial direction is released, the elastic restoring force of the elastic member 28 presses the pressing plate 27, the first bearing 11, and the pressing member 41 toward the other side in the axial direction, and the pressing plate 27 presses the second friction plate 26 furthest on the one side in the axial direction toward the other side in the axial direction. As a result, the first friction plates 25 and the second friction plates 26 are pressed against each other, the first engaging device 7 is connected, and the input member 4 and the rotating member 6 rotate integrally. Accordingly, the sun gear 46 and the ring gear 47 rotate integrally.

In addition, by operating the actuator to disconnect the second engaging device 8, relative rotation of the rotating member 6 with respect to the fixed portion 14 is allowed. As a result, rotation of the sun gear 46 relative to the fixed portion 14 is allowed.

In such a low reduction ratio mode, the sun gear 46, the ring gear 47, and the carrier 48 rotate in the same direction and at the same rotational speed, and the entire planetary reduction mechanism 13 rotates integrally in a so-called glued state. Therefore, the rotational torque of the input member 4 is transmitted as is to the output member 5 without being increased (decelerated) through the path indicated by the thick line in FIG. 2A. In other words, in the low reduction ratio mode, the reduction ratio between the input member 4 and the output member 5 is 1.

<High Reduction Ratio Mode>

To switch the two-speed transmission 1 to the high reduction ratio mode, the first engaging device 7 is disconnected and the second engaging device 8 is connected.

More specifically, as illustrated in FIG. 2B, the electric motor 30 rotates and drives the drive cam 31 in a direction in which the amount that the rolling elements 33 ride up over the bottom portions of the concave portions of the drive cam surface 34 increases. As a result, the driven cam 32 presses the pressing plate 27 toward the one side in the axial direction through the first bearing 11 and the pressing member 41, elastically reduces the axial dimension of the elastic member 28, and releases the force that the first friction plate 25 and the second friction plate 26 press against each other. As a result, the distance between the first friction plates 25 and the second friction plates 26 widens, which disconnects the first engaging device 7 and allows the input member 4 and the rotating member 6 to rotate relative to each other. Therefore, the sun gear 46 and the ring gear 47 are able to rotate relative to each other.

In addition, by operating the actuator to connect the second engaging device 8, relative rotation of the rotating member 6 with respect to the fixed portion 14 is prevented. As a result, rotation of the sun gear 46 with respect to the fixed portion 14 is prevented.

In such a high reduction ratio mode, the rotational torque of the input member 4 is transmitted to the output member 5 along the path indicated by the thick line in FIG. 2B, or in other words, a path through the input member 4, the ring gear 47, rotational motion of the planetary gears 49, revolutionary motion of the planetary gears 49 based on engagement with the sun gear 46, and the carrier 48.

In the high reduction ratio mode, the rotational torque of the input member 4 is increased by the planetary speed reduction mechanism 13 and transmitted to the output member 5. Note that in the high reduction ratio mode, the reduction ratio between the input member 4 and the output member 5 is determined by the gear ratio between the ring gear 47 and the sun gear 46 (the number of teeth of the ring gear 47/the number of teeth of the sun gear 46).

Figure 25:
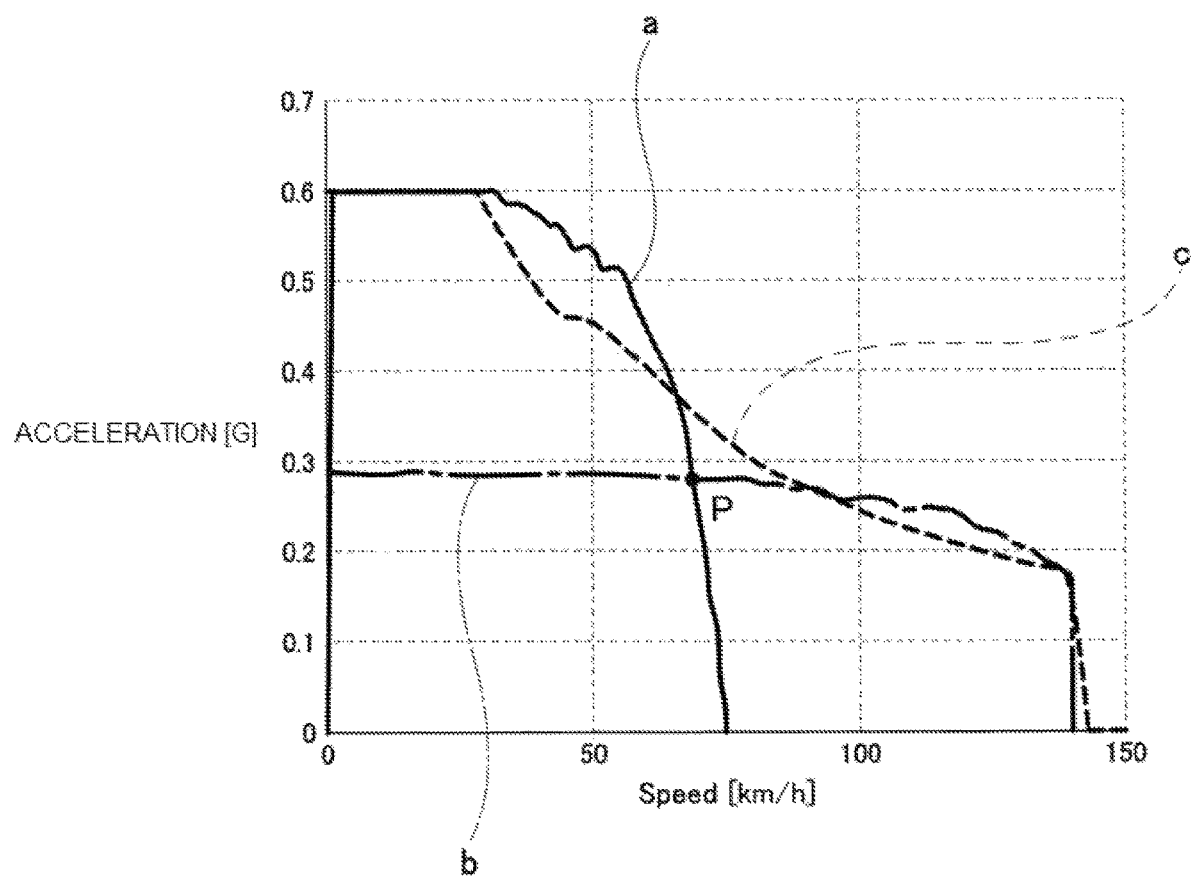
FIG. 25 is a diagram for describing the effect of incorporating a transmission into a drive device using an electric motor as a drive source.

The two-speed transmission 1 of the present example, by switching the connected state and the disconnected state of the first engaging device 7 and the connected state and the disconnected state of the second engaging device 8, is able to switch the reduction ratio between the input member 4 and the output member 5 between two levels, high and low. More specifically, in a region where the rotational torque input to the input member 4 is low speed and high torque, the two-speed transmission 1 is switched to the high reduction ratio mode, and in a region where the rotational torque input to the input member 4 is high speed and low torque, the two-speed transmission 1 is switched to the low reduction ratio mode. Therefore, acceleration performance and high-speed performance when an electric vehicle or hybrid vehicle is driven only by an electric motor as a drive source have characteristics such that the portion on the left side of point P of the solid line a in FIG. 25 and a portion on the right side of point P of the chain line b are continuous, and thus can be made to approach that of a gasoline engine vehicle indicated by the dashed line c in FIG. 25.

When switching the mode of the two-speed transmission 1, switching the connected state and the disconnected state of the first engaging device 7 and switching the connected state and the disconnected state of the second engaging device 8 do not have to be performed completely simultaneously in terms of time, and it is also possible to shift such switching to some extent. That is, the engagement forces and timings of the first engaging device 7 and the second engaging device 8 can be appropriately adjusted so as to reduce shift shock accompanying mode switching of the two-speed transmission 1.

With the two-speed transmission 1 of the present example, it is possible to ensure good torque transmission efficiency. The reason for this will be explained below.

In a state in which the pressing device 10 generates a pressing force, that is, in a state in which the driven cam 32 presses the pressing plate 27 toward the one side in the axial direction through the first bearing 11 and the pressing member 41 (FIG. 2B), a force directed to the one side in the axial direction is applied to the first bearing 11. In addition, a reaction force accompanying the pressing of the pressing plate 27 toward the one side in the axial direction by the driven cam 32 is applied to the second bearing 12 in a direction toward the other side in the axial direction through the rolling elements 33 and the drive cam 31.

The bearing ring 39a on the one side in the axial direction of the first bearing 11 is supported by the rotating member 6 through the pressing member 41 and the pressing plate 27, and the bearing ring 39b on the other side in the axial direction is supported by the fixed portion 14 through the cam device 29, the angular ball bearing 91, and the tubular member 84. In addition, the inner ring 43 of the second bearing 12 is externally fitted and fixed to the rotating member 6, and the outer ring 44 is supported by the drive cam 31 of the cam device 29 through the tubular member 84 and the angular ball bearing 91.

In the two-speed transmission 1 of the present example, in a state in which the pressing device 10 generates a pressing force, that is, in a state in which the pressing plate 27 is pressed toward the one side in the axial direction, the dimension in the axial direction of the elastic member 28 is elastically contracted, the force with which the first friction plates 25 and the second friction plates 26 press against each other is released, and the first engaging device 7 is disconnected, the second engaging device 8 is connected. In the high reduction ratio mode in which the first engaging device 7 is disconnected and the second engaging device 8 is connected, relative rotation of the rotating member 6 with respect to the fixed portion 14 is prevented. In this state, the bearing ring 39*a* on the one side in the axial direction and the bearing ring 39*b* on the other side in the axial direction of the first bearing 11 do not rotate relative to each other, and the inner ring 43 and the outer ring 44 of the second bearing 12 do not rotate relative to each other. In short, in a state in which a force in the axial direction (left-right direction in FIG. 2B) is applied to the first bearing 11 and the second bearing 12 and the rolling resistance is increased, the bearing ring 39*a* on the one side in the axial direction and the bearing ring 39*b* on the other side in the axial direction of the first bearing 11 do not rotate relative to each other, and the inner ring 43 and outer ring 44 of the second bearing 12 do not rotate relative to each other. Therefore, generation of torque loss in the first bearing 11 and the second bearing 12 can be prevented.

Note that the pressing force generated by the pressing device 10 is applied to the rotating member 6 in a direction toward the one side in the axial from the driven cam 32 through the pressing member 41, the first bearing 11, the pressing plate 27, and the elastic member 28. On the other hand, the reaction force accompanying the pressing force generated by the pressing device 10 is applied to the rotating member 6 in a direction toward the other side in the axial direction from the drive cam 31 through the second bearing 12. In this way, the forces in the axial direction accompanying the pressing force generated by the pressing device 10 are canceled out within the rotating member 6.

On the other hand, in a state in which the second engaging device 8 is disconnected and relative rotation of the rotating member 6 with respect to the fixed portion 14 is allowed (state illustrated in FIG. 2A), the first engaging device 7 is connected and the pressing device 10 does not generate a pressing force. In this state, no force is applied to the first bearing 11 and the second bearing 12 in the axial direction (left-right direction in FIG. 2A) due to the pressing force generated by the pressing device 10, and thus rolling resistance of the first bearing 11 and the second bearing 12 does not become excessive, and therefore torque loss does not become excessive.

In short, in the two-speed transmission 1 of the present example, except for a short period of time during mode switching, in a state in which a force in the axial direction accompanying the pressing force generated by the pressing device 10 is applied, and the rolling resistance is increased, the first bearing 11 and the second bearing 12 never rotate. Therefore, it is possible to prevent excessive torque loss from occurring in the first bearing 11 and the second bearing 12, and to ensure good torque transmission efficiency of the two-speed transmission 1.

In this example, rollers are used as the rolling elements 33, and the rolling elements 33 are supported by the driven cam 32 so as to freely rotate about a rotation axis C extending in the radial direction and centered about the central axis of the driven cam 32. Therefore, by rotating the drive cam 31, the driven cam 32 can be reliably displaced in the axial direction. That is, in a case where balls are used as the rolling elements of the cam device, and in a case where the driving cam is rotated, there is a possibility that slippage may occur at the rolling contact portions between the surfaces of the rolling elements and the surface of the drive cam and/or the driven cam. In a case where slippage occurs at the rolling contact portions between the surfaces of the rolling elements and the surface of the drive cam and/or the surface of the driven cam, there is a possibility that the driven cam will not be able to displace in the axial direction, or that the amount of axial displacement of the driven cam relative to the amount of rotation of the drive cam will not be able to be sufficiently ensured.

In the case of the present example, when the drive cam 31 is rotated, it is possible to prevent slippage from occurring at the rolling contact portions between the outer peripheral surfaces of the rolling elements 33 and the drive cam surface 34, and by rotating the drive cam 31, it is possible for the driven cam 32 to be reliably displaced in the axial direction. As a result, mode switching of the two-speed transmission 1 can be performed reliably. However, as described above, it is possible to use balls as the rolling elements of the cam device.

In the present example, as the second engaging device 8, a clutch that can be switched between a connected state and disconnected state by an actuator is employed; however, in a case of implementing the present invention, the second engaging device is not particularly limited, and as long as it is disconnected in the low reduction ratio mode in which the first engaging device is connected, and it is connected in the high reduction ratio mode in which the first engaging device is disconnected, conventionally known clutches having various structures can be employed. For example, a one-way clutch including a freewheel can be used as the second engaging device. In a case of using a one-way clutch without an actuator as the second engaging device, the second engaging device allows the rotating member to rotate in the same direction as the rotating direction of the input member when the vehicle moves forward, and is configured to prevent the rotating member from rotating in a direction opposite to the rotating direction of the input member when the vehicle moves forward.

In the present example, the pressing device 10 includes a cam device 29 in which rolling elements 33 are sandwiched between a drive cam 31 and a driven cam 32, and an electric motor 30; however, in a case of implementing the present invention, the pressing device is not particularly limited, and as long as the pressing device is able to press the elastic biasing means in a direction to release the force that presses the first friction plates and the second friction plates against each other, pressing devices of various structures can be employed. For example, as a pressing device, a cam device in which a drive cam surface provided on a drive cam and a driven cam surface provided on a driven cam are directly engaged (sliding), a cam device having a driven cam having a guide groove extending in the circumferential direction on an outer peripheral surface and varying in the axial direction, and a drive cam having an engaging convex portion that engages so as to displace along the guide groove, or the like can be used. Alternatively, a hydraulic cylinder device can be used as the pressing device.

In the present example, a single pinion type planetary gear mechanism is adopted as the planetary speed reduction mechanism 13; however, in a case of implementing the present invention, a double pinion type planetary gear mechanism can also be adopted as the planetary speed reduction mechanism. Alternatively, the planetary speed reduction mechanism may be configured by a friction roller mechanism having a sun roller, a ring roller arranged around the sun roller, and a planetary roller arranged between the sun roller and the ring roller in the radial direction, and having a rolling contact surface, which is an outer peripheral surface, frictionally engaged with the outer peripheral surface of the sun roller and the inner peripheral surface of the ring roller.

Second Example

A second example of an embodiment of the present invention will be described with reference to FIG. 4. In this example, a hollow output member 5a is supported around a solid input member 4a so as to rotate relative to the input member 4a, a hollow rotating member 6a is supported around the output member 5a so as to rotate relative to the output member 5a.

The input member 4a is configured integrally with the output shaft of a drive source 2.

The output member 5a is connected to an input portion of a differential device 3 through an intermediate transmission shaft 50 so as to transmit torque. That is, an output gear 18 provided on the output member 5a is engaged with a large-diameter gear 51 provided on the intermediate transmission shaft 50, and a small-diameter gear 52 provided on the intermediate transmission shaft 50 is engaged with a gear provided at the input portion the differential device 3.

In the illustrated example, the direction in the axial direction of the two-speed transmission 1 is opposite to that of the two-speed transmission 1 of the first example illustrated in FIG. 1 (left and right are reversed). In this example as well, the forces in the axial direction accompanying generation of the pressing force by a pressing device 10 are canceled out within the rotating member 6a and/or a fixed portion 14. The configuration and effects of other parts are the same as those of the first example.

Third Example

A third example of an embodiment of the present invention will be described with reference to FIG. 15 to FIG. 16B. In the two-speed transmission 1a of the present example, a sun gear 46 is connected to an input member 4b so as to transmit torque, a ring gear 47 is connected to a rotating member 6b so as to transmit torque, and a carrier 48 is connected to an output member 5b so as to transmit torque.

Figure 15:
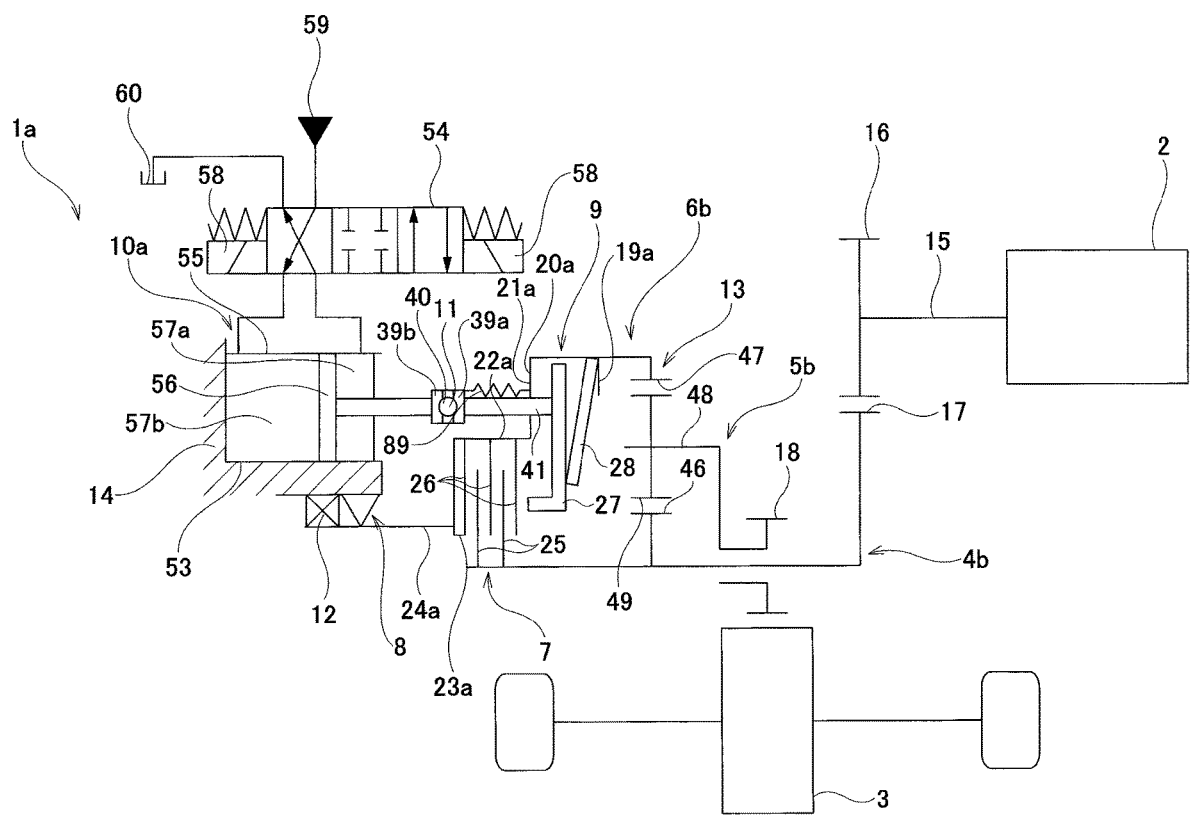
FIG. 15 is a schematic cross-sectional view of a drive system incorporating a two-speed transmission of a third example of an embodiment of the present invention.

The rotating member 6b has a small-diameter flange portion 19a protruding inward in the radial direction at an intermediate portion in the axial direction, and has a flange portion 20a protruding inward in the radial direction at an end portion on the other side in the axial direction (left side in FIG. 15). The flange portion 20a has a hollow circular plate-shaped first circular ring portion 21a, a first cylindrical portion 22a bent from an end portion at an inner side in the radial direction of the first circular ring portion 21a toward the other side in the axial direction, a hollow circular plate-shaped second circular ring portion 23a bent inward in the radial direction from an end portion on the other side in the axial direction of the first cylindrical portion 22a, and a second cylindrical portion 24a bent toward the other side in the axial direction from an end portion at an inner side in the radial direction of the second circular ring portion 23a.

In this example, the first friction plates 25 of a first engaging device 7 are supported at an outer peripheral surface of an end portion on the other side in the axial direction of an input member 4b so as to displace in the axial direction. Of the second friction plates 26, the second friction plate 26 located the furthest on the other side in the axial direction is supported by an inner peripheral surface of the first cylindrical portion 22a of the rotating member 6b so as not to be able to displace in the axial direction, and the other second friction plates 26 are supported by the inner peripheral surface of the first cylindrical portion 22a so as to displace in the axial direction.

A second engaging device 8 is provided between an inner peripheral surface of the fixed portion 14 and the second cylindrical portion 24a of the rotating member 6b.

In the present example, a pressing device 10a includes a cylinder device 53 and a direction switching valve 54.

The cylinder device 53 is configured by fitting a piston 56 into a cylinder 55, and has a pair of hydraulic chambers 57a and 57b provided in the cylinder 55 with the piston 56 interposed therebetween. Note that the first bearing 11 and the pressing member 41 are provided between the piston 56 and a pressing plate 27 of an elastic biasing means 9.

The direction switching valve 54, based on electric current flowing to a solenoid 58, switches between a state in which one of the pair of hydraulic chambers 57a and 57b is connected to a hydraulic source 59 to increase hydraulic pressure, and the other hydraulic chamber is connected to an oil reservoir 60 to release the hydraulic pressure, and a reverse state thereof.

<Low Reduction Ratio Mode>

Figure 16A:
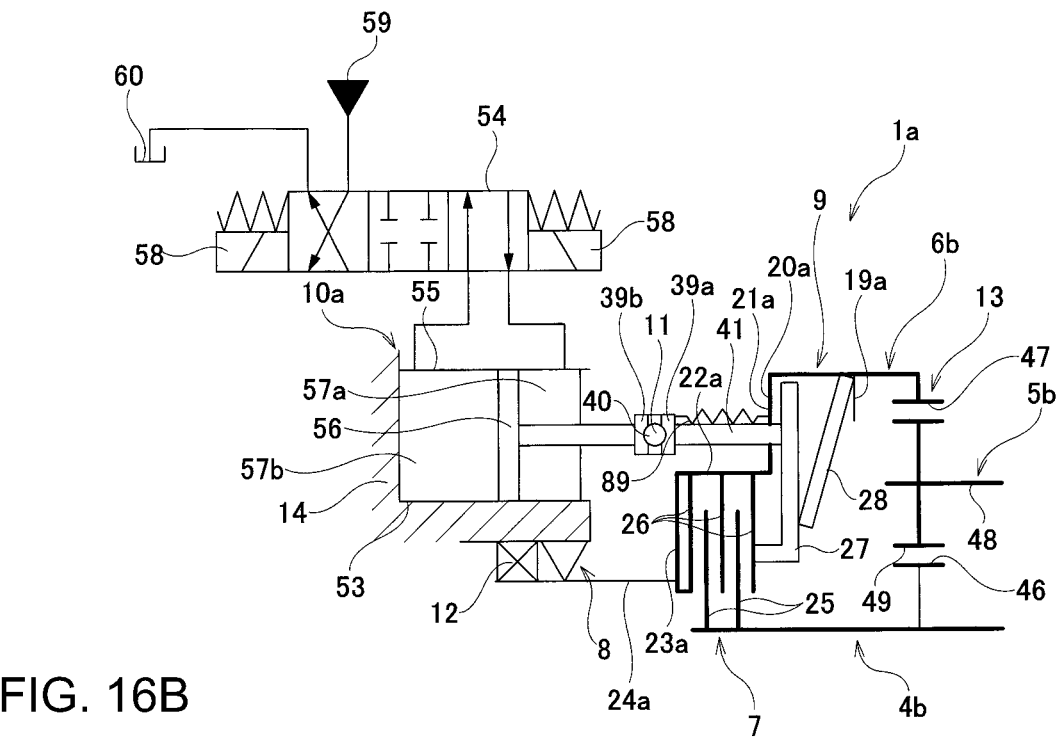
FIG. 16A is a schematic cross-sectional view illustrating a torque transmission path in a low reduction ratio mode of the two-speed transmission of the third example.

In order to switch the two-speed transmission 1a of the present example to the low reduction ratio mode, as illustrated in FIG. 16A, by electric current flowing to the solenoid 58, the direction switching valve 54 is operated to connect the hydraulic chamber 57a on the one side in the axial direction to the hydraulic source 59 to increase the hydraulic pressure, and connect the hydraulic chamber 57b on the other side in the axial direction to the oil reservoir 60 to release the hydraulic pressure. As a result, the piston 56, through the first bearing 11 and the pressing member 41, releases the force pressing the pressing plate 27 toward the one side in the axial direction. When the force pressing the pressing plate 27 toward the one side in the axial direction is released, the elastic restoring force of the elastic member 28 presses the pressing plate 27, the first bearing 11, and the pressing member 41 toward the other side in the axial direction, and the pressing plate 27 presses the second friction plate 26 the furthest on the one side in the axial direction toward the other side in the axial direction. As a result, the first friction plates 25 and the second friction plates 26 are pressed against each other, the first engaging device 7 is connected, and the input member 4b and the rotating member 6b rotate integrally. Accordingly, the sun gear 46 and the ring gear 47 rotate integrally.

In addition, by operating the actuator and disconnecting the second engaging device 8, the relative rotation of the rotating member 6b with respect to the fixed portion 14 is allowed, and the rotation of the sun gear 46 with respect to the fixed portion 14 is allowed.

As a result, the sun gear 46, the ring gear 47, and the carrier 48 rotate in the same direction and at the same rotational speed, and the entire planetary speed reduction mechanism 13 rotates integrally, resulting in a so-called glued state, and the rotational torque of the input member 4b is transmitted along the path indicated by the thick line in FIG. 16A as is to the output member 5b without being increased (decelerated).

<High Reduction Ratio Mode>

Figure 16B:
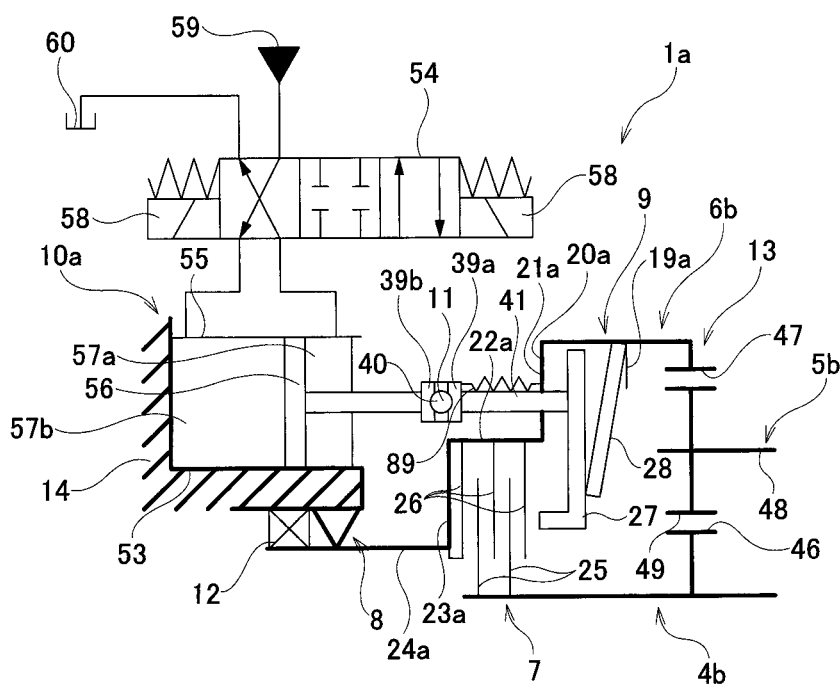
FIG. 16B is a schematic cross-sectional view illustrating a torque transmission path in a high reduction ratio mode of the two-speed transmission of the third example.

In order to switch the two-speed transmission 1a of the present example to the high reduction ratio mode, as illustrated in FIG. 16B, by electric current flowing to the solenoid 58, the direction switching valve 54 is operated to connect the hydraulic chamber 57a on the one side in the axial direction to the oil reservoir 60 to release the hydraulic pressure, and connect the hydraulic chamber 57b on the other side in the axial direction to the hydraulic source 59 to increase the hydraulic pressure. As a result, the piston 56 presses the pressing plate 27 toward the one side in the axial direction through the first bearing 11 and the pressing member 41 to elastically contract the dimension in the axial direction of the elastic member 28 and release the force pressing the first friction plates 25 and the second friction plates 26 against each other. As a result, the action of the return spring widens an interval between the first friction plates 25 and the second friction plates 26, disengages the first engaging device 7, and allows the input member 4b and the rotating member 6b to rotate relative to each other. Therefore, the sun gear 46 and the ring gear 47 are able to rotate relative to each other.

In addition, by operating the actuator and connecting the second engaging device 8, rotation of the rotating member 6b with respect to the fixed portion 14 is prevented, and rotation of the ring gear 47 with respect to the fixed portion 14 is prevented.

In such a high reduction ratio mode, the rotational torque of the input member 4b is transmitted to the output member 5b along the path indicated by the thick line in FIG. 16B, or in other words, a path through the input member 4b, the sun gear 46, rotational motion of the planetary gears 49, revolutionary motion of the planetary gears 49 based on engagement with the ring gear 47, and the carrier 48. That is, in the high reduction ratio mode, the rotational torque of the input member 4b is increased by the planetary speed reduction mechanism 13 and transmitted to the output member 5b.

In the two-speed transmission 1a of the present example as well, except for a short period of time during mode switching, in a state in which a force in the axial direction accompanying the pressing force generated by the pressing device 10a is applied, and the rolling resistance is increased, the first bearing 11 and the second bearing 12 never rotate. Therefore, it is possible to prevent excessive torque loss from occurring in the first bearing 11 and the second bearing 12, and to ensure good torque transmission efficiency of the two-speed transmission 1a. The configuration and effects of other parts are the same as those of the first example.

Fourth Example

A fourth example of an embodiment of the present invention will be described with reference to FIG. 17 to FIG. 19. In the two-speed transmission 1b of the present example, a sun gear 46 is connected to an input member 4c so as to transmit torque, a ring gear 47 is connected to a rotating member 6c so as to transmit torque, and a carrier 48 is connected to an output member 5c so as to transmit torque.

Figure 17:
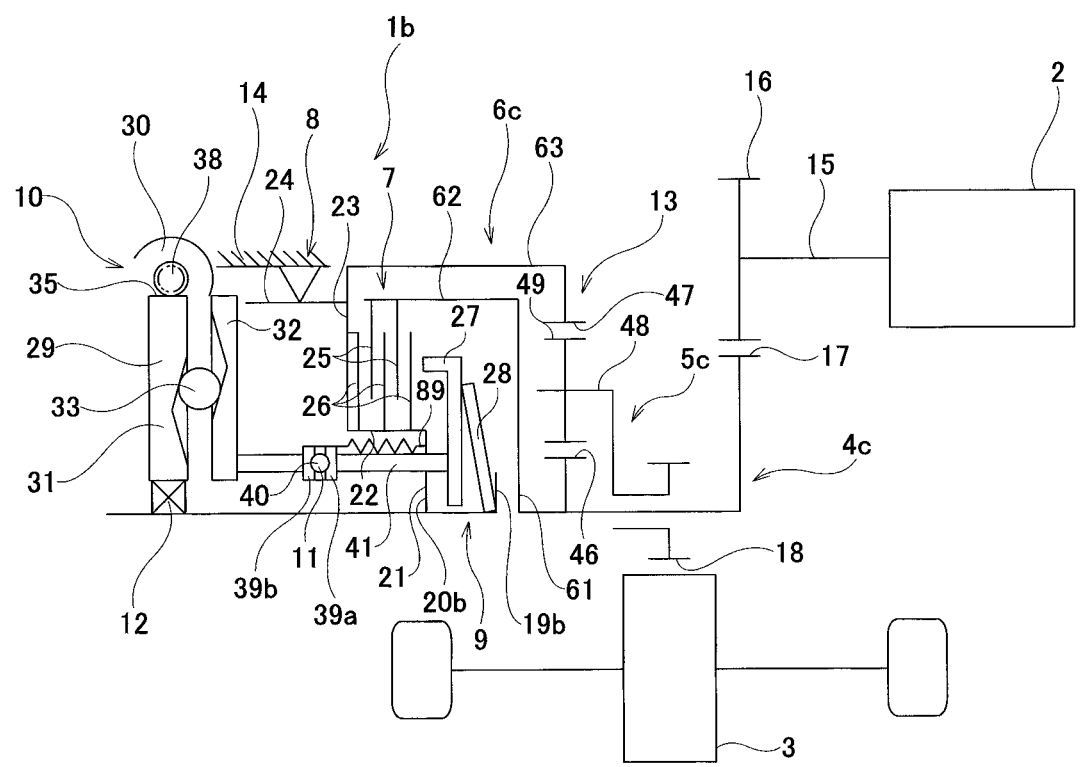
FIG. 17 is a schematic cross-sectional view of a drive system incorporating a two-speed transmission of a fourth example of an embodiment of the present invention.

The input member 4c has an input gear 17 at an end portion on the one side in the axial direction (right side in FIG. 17). The sun gear 46 is provided at an intermediate portion in the axial direction of the input member 4c. In addition, the input member 4c includes a flange portion 61 bent outward in the radial direction from a portion further on the other side in the axial direction (the left portion in FIG. 17) than a portion where the sun gear 46 is provided, and has a cylindrical portion 62 bent toward the other side in the axial direction from an end portion at an outer side in the radial direction of the flange portion 61. The first friction plates 25 of the first engaging device 7 are supported by an inner peripheral surface of an end portion on the other side in the axial direction of the cylindrical portion 62 so as to displace in the axial direction.

The rotating member 6c has a small-diameter flange portion 19b protruding outward in the radial direction at an end portion on the one side in the axial direction, and a flange portion 20b protruding outward in the radial direction at an intermediate portion in the axial direction. The flange portion 20b has a hollow circular plate-shaped first circular ring portion 21, a first cylindrical portion 22 bent toward the other side in the axial direction from an end portion at an outer side in the radial direction of the first circular ring portion 21, a hollow circular plate-shaped second circular ring portion 23 bent outward in the radial direction from an end portion on the other side in the axial direction of the first cylindrical portion 22, a second cylindrical portion 24 bent toward the other side in the axial direction from an intermediate portion in the radial direction of the second circular ring portion 23, and a third cylindrical portion 63 bent toward the one side in the axial direction from an end portion at an outer side in the radial direction of the second circular ring portion 23. The ring gear 47 is provided at an end portion on the one side in the axial direction of the third cylindrical portion 63.

<Low Reduction Ratio Mode>

Figure 18A:
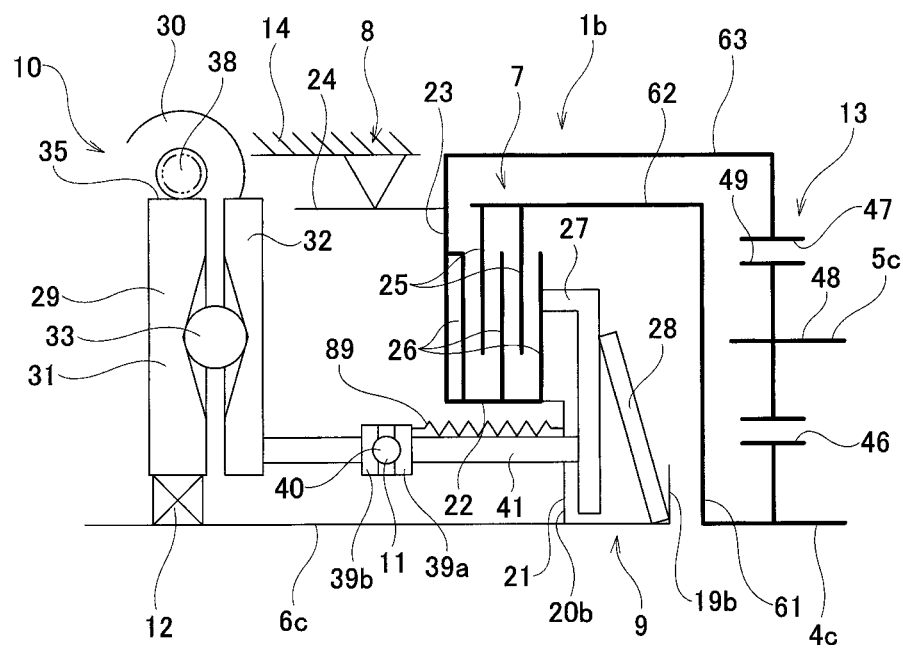
FIG. 18A is a schematic cross-sectional view illustrating a torque transmission path in a low reduction ratio mode of the two-speed transmission of the fourth example.
Figure 19:
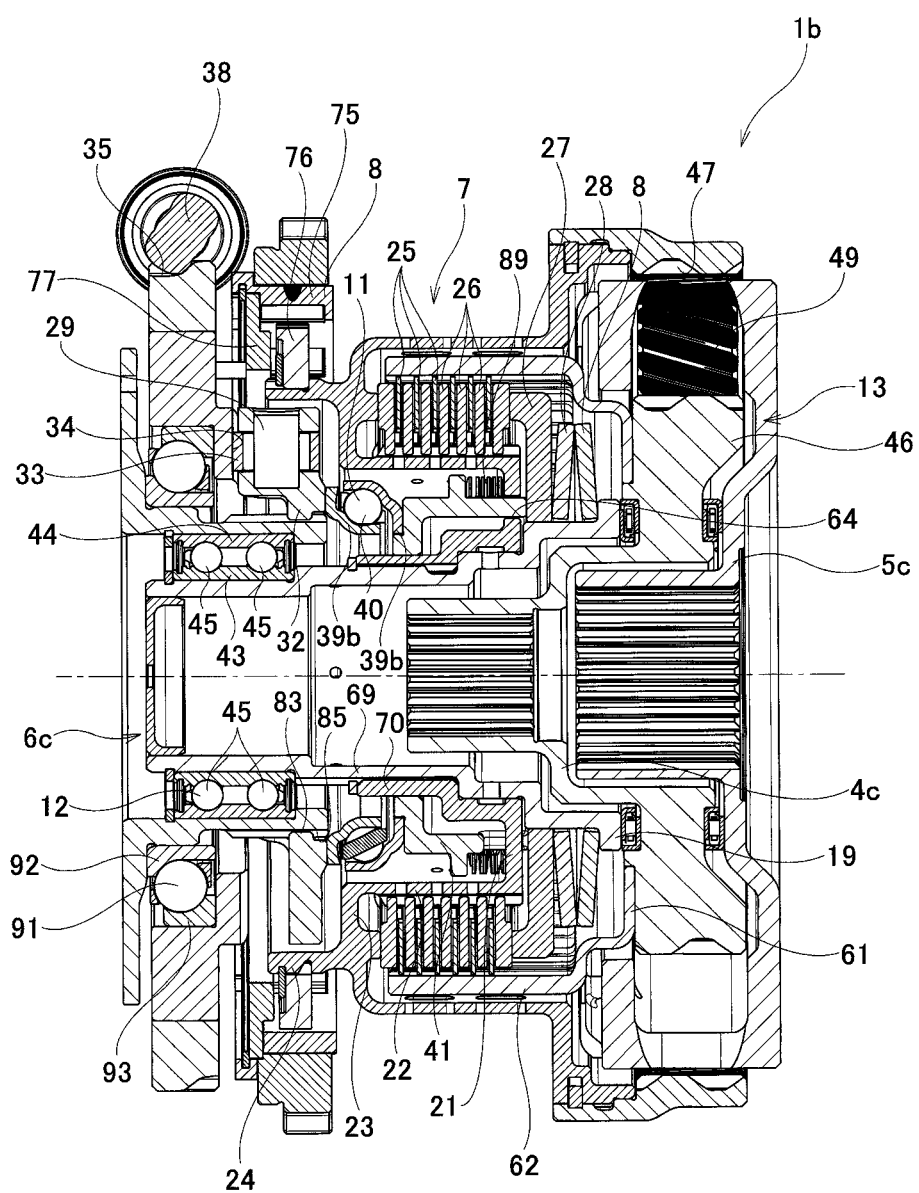
FIG. 19 is a cross-sectional view of the two-speed transmission of the fourth example.

In order to switch the two-speed transmission 1b of the present example to the low reduction ratio mode, as illustrated in FIG. 18A, by connecting the first engaging device 7, the input member 4c and the rotating member 6c are rotated integrally, so that the sun gear 46 and the ring gear 47 are rotated integrally. In addition, disconnecting the second engaging device 8 allows relative rotation of the rotating member 6c with respect to the fixed portion 14 and allows rotation of the ring gear 47 with respect to the fixed portion 14.

As a result, the sun gear 46, the ring gear 47, and the carrier 48 rotate in the same direction and at the same rotational speed, and the entire planetary speed reduction mechanism 13 rotates integrally, resulting in a so-called glued state, and the rotational torque of the input member 4c is transmitted along the path indicated by the thick line in FIG. 18A as is to the output member 5c without being increased (decelerated).

<High Reduction Ratio Mode>

Figure 18B:
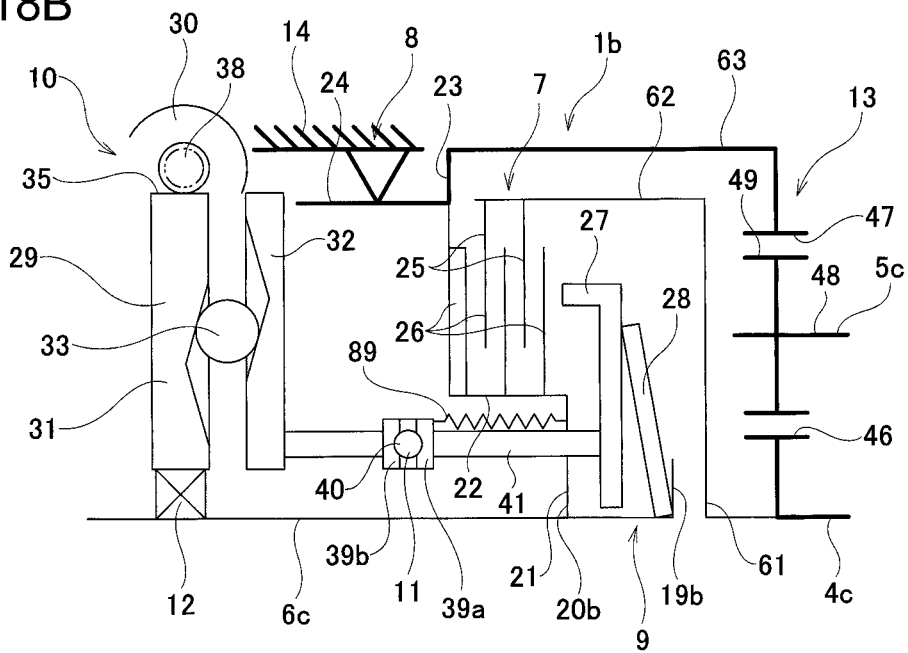
FIG. 18B is a schematic cross-sectional view illustrating a torque transmission path in a high reduction ratio mode of the two-speed transmission of the fourth example.

In order to switch the two-speed transmission 1b of the present example to the high reduction ratio mode, as illustrated in FIG. 18B, disconnecting the first engaging device 7 allows relative rotation between the input member 4c and the rotating member 6c, and allows relative rotation between the sun gear 46 and the ring gear 47. In addition, connecting the second engaging device 8 prevents relative rotation of the rotating member 6c with respect to the fixed portion 14 and prevents rotation of the ring gear 47 with respect to the fixed portion 14.

In such a high reduction ratio mode, the rotational torque of the input member 4c is transmitted to the output member 5c along the path indicated by the thick line in FIG. 18B, or in other words, a path through the input member 4c, the sun gear 46, rotational motion of the planetary gears 49, revolutionary motion of the planetary gears 49 based on engagement with the ring gear 47, and the carrier 48. That is, in the high reduction ratio mode, the rotational torque of the input member 4c is increased by the planetary speed reduction mechanism 13 and transmitted to the output member 5c.

In the two-speed transmission 1b of the present example as well, except for a short period of time during mode switching, in a state in which a force in the axial direction accompanying the pressing force generated by the pressing device 10 is applied, and the rolling resistance is increased, the first bearing 11 and the second bearing 12 never rotate. Therefore, it is possible to prevent excessive torque loss from occurring in the first bearing 11 and the second bearing 12, and to ensure good torque transmission efficiency of the two-speed transmission 1b. The configuration and effects of other parts are the same as those of the first example.

Fifth Example

Figure 20:
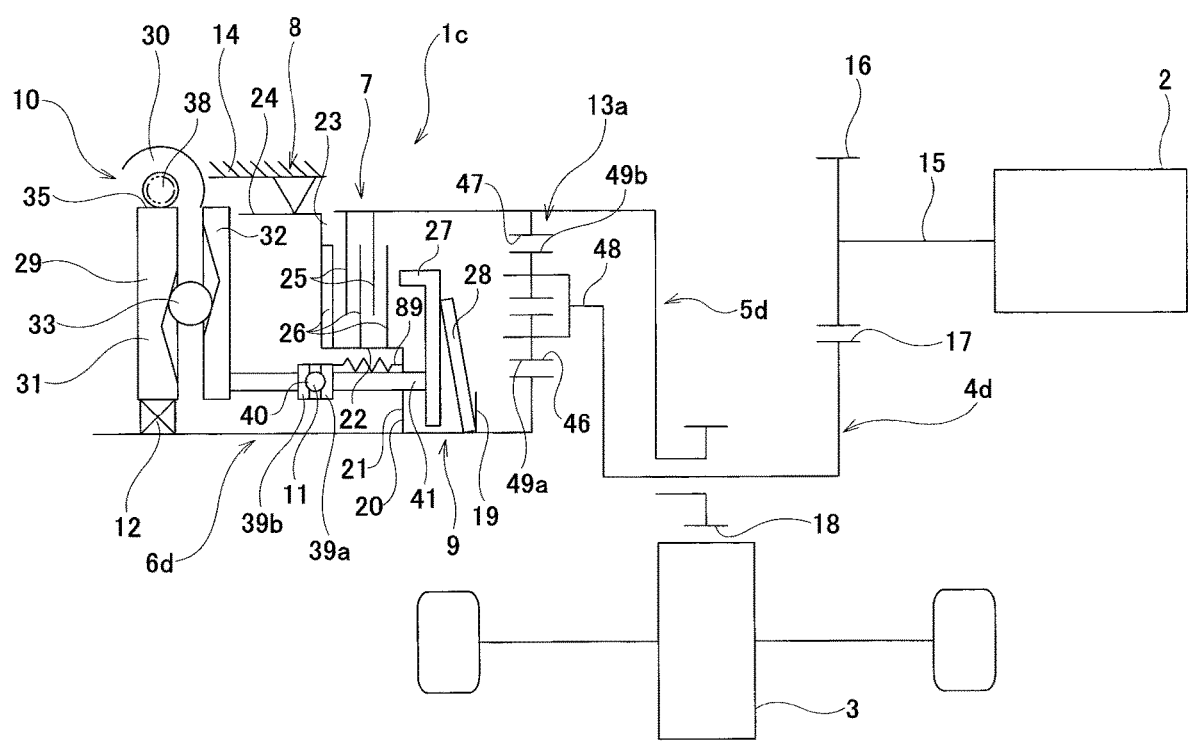
FIG. 20 is a schematic cross-sectional view of a drive system incorporating a two-speed transmission of a fifth example of an embodiment of the present invention.

A fifth example of an embodiment of the present invention will be described with reference to FIG. 20 to FIG. 21B. In the present example, a planetary speed reduction mechanism 13a includes a sun gear 46 as a sun element, a ring gear 47 as a ring element, a carrier 48 as a carrier element, the first planetary gears 49a, each as a first planetary element, and the second planetary gears 49b, each as a second planetary element. That is, in the present example, the planetary speed reduction mechanism 13a is configured by a double pinion type planetary gear mechanism.

The first planetary gears 49a and the second planetary gears 49b are engaged with each other as sets of one first planetary gear 49a and one second planetary gear 49b, and are supported by the carrier 48 so as to rotate around their own central axes. In addition, the first planetary gears 49a located on the inner side in the radial direction are engaged with the sun gear 46, and the second planetary gears 49b located on the outer side in the radial direction are engaged with the ring gear 47.

In the two-speed transmission 1c of the present example, the sun gear 46 is connected to a rotating member 6d so as to transmit torque, the ring gear 47 is connected to an output member 5d so as to transmit torque, and the carrier 48 is connected to an input member 4d so as to transmit torque.

<Low Reduction Ratio Mode>

Figure 21A:
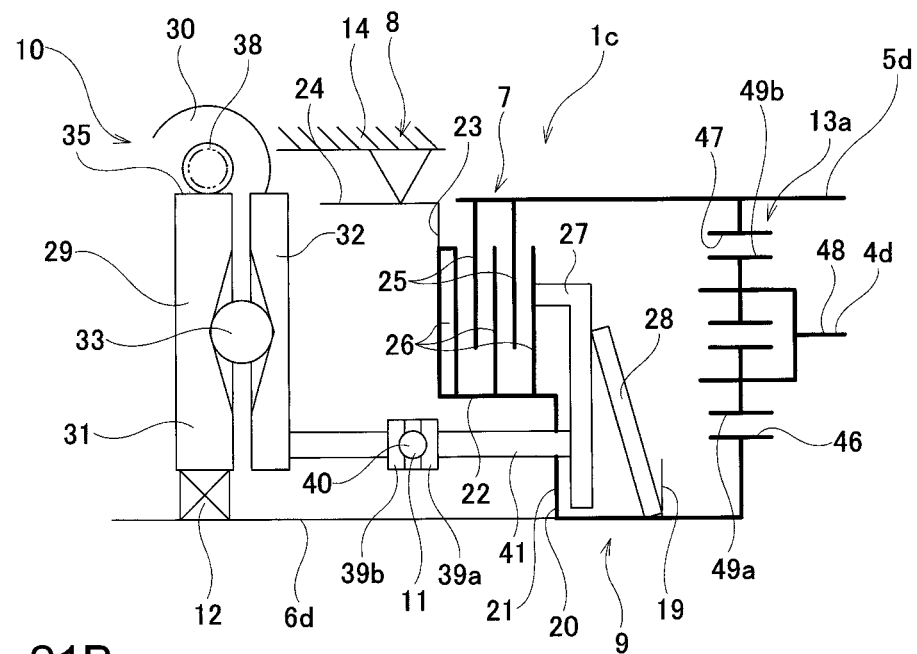
FIG. 21A is a schematic cross-sectional view illustrating a torque transmission path in a low reduction ratio mode of the two-speed transmission of the fifth example.

In order to switch the two-speed transmission 1c of the present example to the low reduction ratio mode, as illustrated in FIG. 21A, by connecting the first engaging device 7, the input member 4d and the rotating member 6d are rotated integrally, so that the sun gear 46 and the ring gear 47 are rotated integrally. In addition, disconnecting the second engaging device 8 allows relative rotation of the rotating member 6d with respect to a fixed portion 14 and allows rotation of the ring gear 47 with respect to the fixed portion 14.

As a result, the sun gear 46, the ring gear 47, and the carrier 48 rotate in the same direction and at the same rotational speed, and the entire planetary speed reduction mechanism 13a rotates integrally, resulting in a so-called glued state, and the rotational torque of the input member 4d is transmitted along the path indicated by the thick line in FIG. 21A as is to the output member 5d without being increased (decelerated).

<High Reduction Ratio Mode>

Figure 21B:
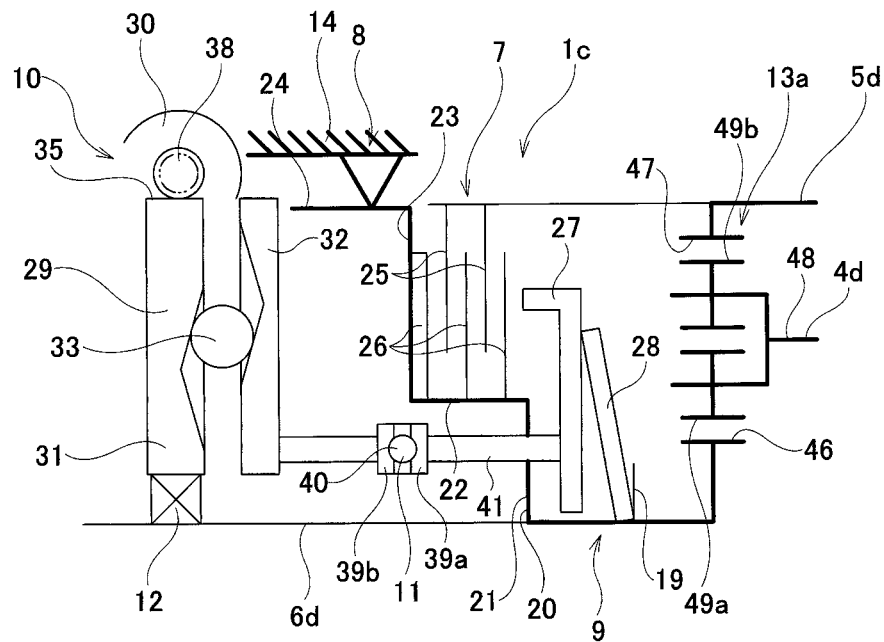
FIG. 21B is a schematic cross-sectional view illustrating a torque transmission path in a high reduction ratio mode of the two-speed transmission of the fifth example.

In order to switch the two-speed transmission 1c of the present example to the high reduction ratio mode, as illustrated in FIG. 21B, disconnecting the first engaging device 7 allows relative rotation between the input member 4d and the rotating member 6d, and allows relative rotation between the sun gear 46 and the ring gear 47. In addition, connecting the second engaging device 8 prevents rotation of the rotating member 6d with respect to the fixed portion 14 and prevents rotation of the sun gear 46 with respect to the fixed portion 14.

In such a high reduction ratio mode, the rotational torque of the input member 4d is transmitted to the output member 5d along the path indicated by the thick line in FIG. 21B, or in other words, a path through the input member 4d, the carrier 48, revolutionary motion of the first planetary gear 49a and the second planetary gear 49b, rotational motion of the first planetary gear 49a based on engagement with the sun gear 46, rotational motion of the second planetary gear 49b and the ring gear 47. That is, in the high reduction ratio mode, the rotational torque of the input member 4d is increased by the planetary speed reduction mechanism 13a and transmitted to the output member 5d.

In the two-speed transmission 1c of the present example as well, except for a short period of time during mode switching, in a state in which a force in the axial direction accompanying the pressing force generated by a pressing device 10 is applied, and the rolling resistance is increased, the first bearing 11 and the second bearing 12 never rotate. Therefore, it is possible to prevent excessive torque loss from occurring in the first bearing 11 and the second bearing 12, and to ensure good torque transmission efficiency of the two-speed transmission 1c. The configuration and effects of other parts are the same as those of the first example.

Sixth Example

Figure 22:
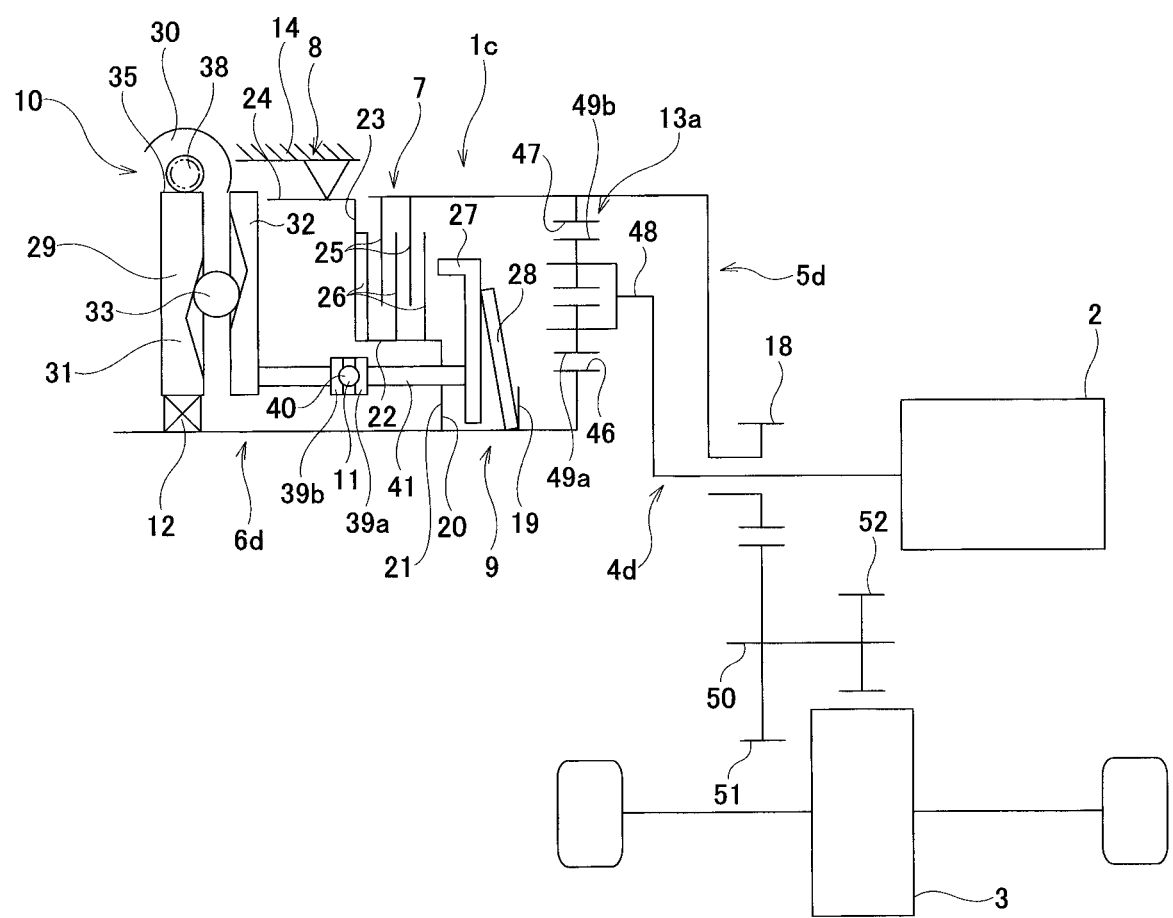
FIG. 22 is a schematic cross-sectional view of a drive system incorporating a two-speed transmission of a sixth example of an embodiment of the present invention.

A sixth example of an embodiment of the present invention will be described with reference to FIG. 22. In the present example, an output member 5d is connected to an input portion of a differential device 3 through an intermediate transmission shaft 50 so as to transmit torque. That is, an output gear 18 provided on the output member 5d is engaged with a large-diameter gear 51 provided on the intermediate transmission shaft 50, and a small-diameter gear 52 provided on the intermediate transmission shaft 50 is engaged with a gear provided at the input portion of the differential device 3. The configuration and effects of other parts are the same as those of the first example and fifth example.

Seventh Example

Figure 23:
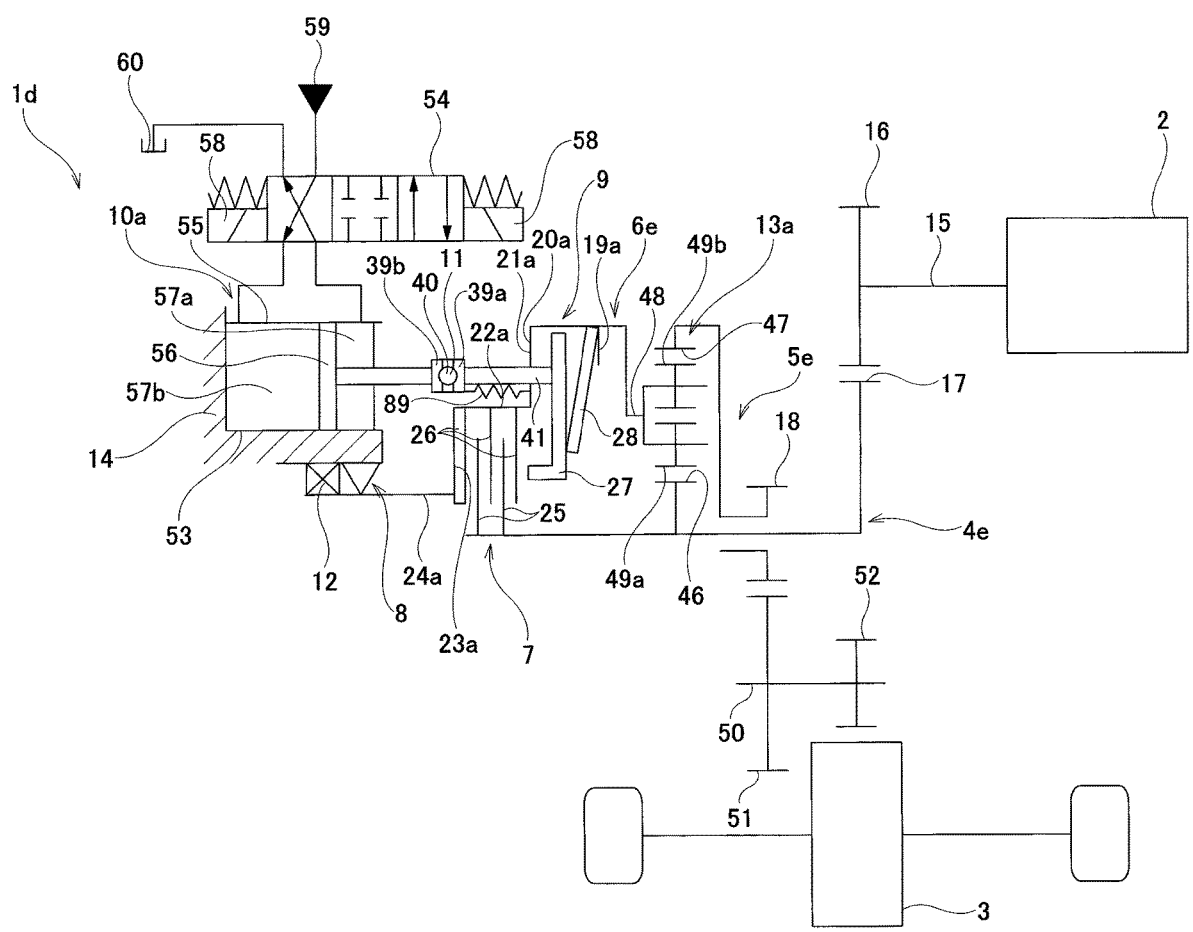
FIG. 23 is a schematic cross-sectional view of a drive system incorporating a two-speed transmission of a seventh example of an embodiment of the present invention.

A seventh example of an embodiment of the present invention will be described with reference to FIG. 23 to FIG. 24B. A two-speed transmission 1d of this example includes a double-pinion planetary speed reduction mechanism 13a. In the present example, a sun gear 46 is connected to an input member 4e so as to transmit torque, a ring gear 47 is connected to an output member 5e so as to transmit torque, and a carrier 48 is connected to a rotating member 6e so as to transmit torque. In addition, the output member 5e is connected to an input portion of a differential device 3 through an intermediate transmission shaft 50 so as to transmit torque.

<Low Reduction Ratio Mode>

Figure 24A:
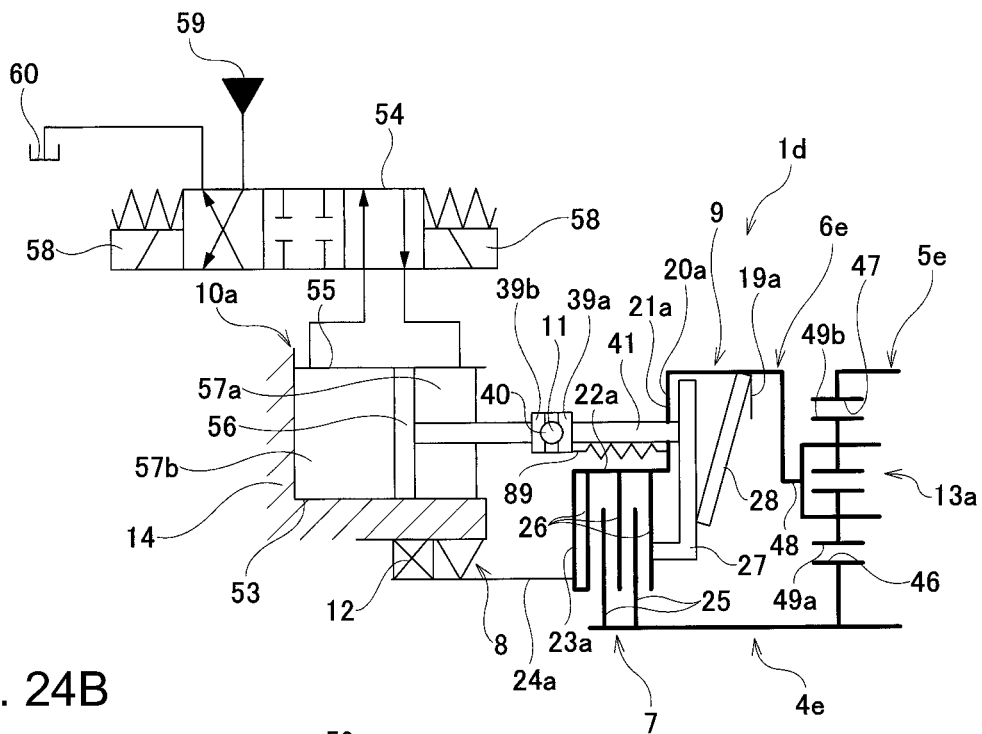
FIG. 24A is a schematic cross-sectional view illustrating a torque transmission path in a low reduction ratio mode of the two-speed transmission of the seventh example.

In order to switch the two-speed transmission 1d of the present example to the low reduction ratio mode, as illustrated in FIG. 24A, by connecting a first engaging device 7, the input member 4e and the rotating member 6e are rotated integrally, so that the sun gear 46 and the carrier 48 are rotated integrally. In addition, by disconnecting a second engaging device 8, relative rotation of the rotating member 6e with respect to a fixed portion 14 is allowed, and rotation of the carrier 48 with respect to the fixed portion 14 is allowed.

As a result, the sun gear 46, the ring gear 47, and the carrier 48 rotate in the same direction and at the same rotational speed, the entire planetary speed reduction mechanism 13a rotates integrally, resulting in a so-called glued state, and the rotational torque of the input member 4e is transmitted along the path indicated by the thick line in FIG. 24A as is to the output member 5e without being increased (decelerated).

<High Reduction Ratio Mode>

Figure 24B:
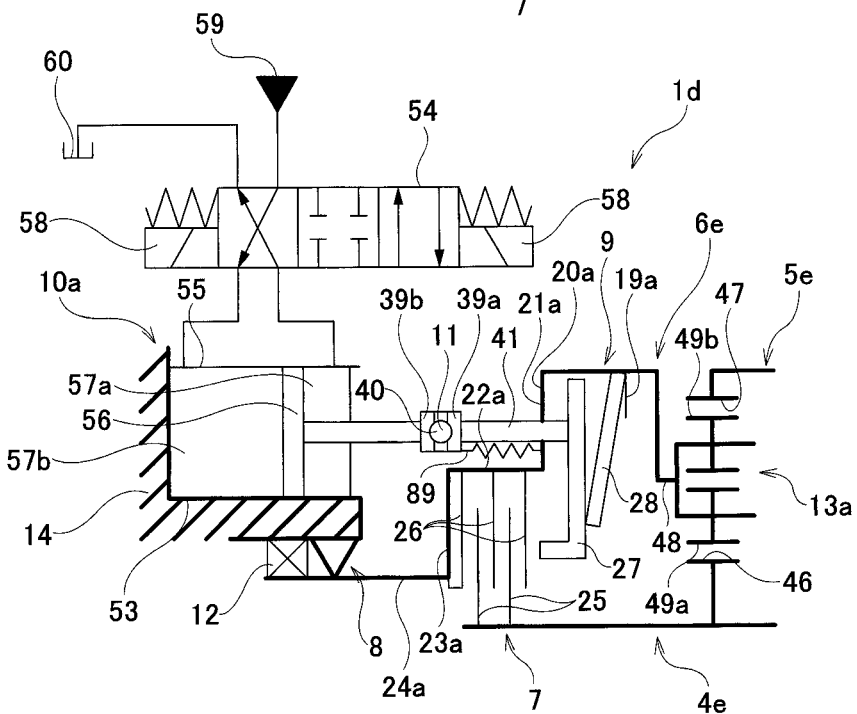
FIG. 24B is a schematic cross-sectional view illustrating a torque transmission path in a high reduction ratio mode of the two-speed transmission of the seventh example.

In order to switch the two-speed transmission 1d of the present example to the high reduction ratio mode, as illustrated in FIG. 24B, disconnecting the first engaging device 7 allows relative rotation between the input member 4e and the rotating member 6e, and allows relative rotation between the sun gear 46 and the carrier 48. In addition, connecting the second engaging device 8 prevents rotation of the rotating member 6e with respect to the fixed portion 14 and prevents rotation of the carrier 48 with respect to the fixed portion 14.

In such a high reduction ratio mode, the rotational torque of the input member 4e is transmitted to the output member 5e along a path indicated by the thick line in FIG. 24B, or in other words, along a path through the input member 4e, the sun gear 46, the rotational motion of the first planetary gear 49a, the rotational motion of the second planetary gear 49b, and the ring gear 47. That is, in the high reduction ratio mode, the rotational torque of the input member 4e is increased by the planetary speed reduction mechanism 13a and transmitted to the output member 5e.

In the two-speed transmission 1d of the present example as well, except for a short period of time during mode switching, in a state in which a force in the axial direction accompanying the pressing force generated by the pressing device 10 is applied, and the rolling resistance is increased, the first bearing 11 and the second bearing 12 never rotate. Therefore, it is possible to prevent excessive torque loss from occurring in the first bearing 11 and the second bearing 12, and to ensure good torque transmission efficiency of the two-speed transmission 1d. The configuration and effects of other parts are the same as those of the first example, third example, and fifth example.

The examples of embodiments described above can be implemented in combination as appropriate as long as there is no contradiction.

REFERENCE SIGNS LIST 1, 1a, 1b, 1c, 1d Two-speed transmission
2 Drive source
3 Differential device
4, 4a, 4b, 4c, 4d, 4e Input member
5, 5a, 5b, 5c, 5d, 5e Output member
6, 6a, 6b. 6c. 6d, 6e Rotating member
7 First engaging device
8 Second engaging device
9 Elastic biasing means
10, 10a Pressing device
11 First bearing
12 Second bearing
13, 13a Planetary speed reduction mechanism
14 Fixed portion
15 Output shaft
16 Drive gear
17 Input gear
18 Output gear
19, 19a, 19b Small-diameter flange portion
20, 20a, 20b Flange portion
21, 21a First circular ring portion
22, 22a First cylindrical portion
23, 23a Second circular ring portion
24, 24a Second cylindrical portion
25 First friction plate
26 Second friction plate
27 Pressing plate
28 Elastic member
29 Cam device
30 Electric motor
31 Drive cam
32 Driven cam
33 Rolling element
34 Drive cam surface
35 Wheel teeth
38 Worm
39a, 39b Bearing ring
40 Rolling element
41 Pressing member
43 Inner ring
44 Outer ring
45 Rolling element
46 Sun gear
47 Ring gear
48 Carrier
49 Planetary gear
49a First planetary gear
49b Second planetary gear
50 Intermediate transmission shaft
51 Large-diameter gear
52 Small-diameter gear
53 Cylinder device
54 Direction switching valve
55 Cylinder
56 Piston
57a, 57b Hydraulic chamber
58 Solenoid
59 Hydraulic source
60 Oil reservoir
61 Flange portion
62 Cylindrical portion
63 Third cylindrical portion
64 Through hole
69 Shaft member
70 Stepped cylindrical member
71 Female spline portion
72 Base portion
73 Partial cylindrical portion
74 Small-diameter cylindrical portion
75 Outer-diameter side cylindrical member
76 Inner-diameter side cylindrical member
77 Selection plate
78 Outer peripheral side concave-convex portion
79 Rectangular hole
80a, 80b Support plate portion
81 Support hole
82 Support concave portion
83 Female spline portion
84 Tubular member
85 Male spline portion
86 Support shaft
87 Roller
88a, 88b Support bearing
89 Preload applying means
90 Pin portion
91 Angular ball bearing
92 Inner ring
93 Outer ring

The invention claimed is:

1. A two-speed transmission, comprising:
an input member rotatably supported with respect to a fixed portion that does not rotate even during use;
an output member supported coaxially with the input member and supported so as to rotate relative to the input member;

a rotating member supported coaxially with the input member and the output member and supported so as to rotate relative to the input member and the output member;

a first engaging device provided between the input member and the rotating member, having a first friction plate and a second friction plate that are supported so as to relatively displace in an axial direction, and configured to switch to a state in which, by pressing the first friction plate and the second friction plate against each other, the input member and the rotating member integrally rotate, and switch to a state in which, by releasing a force of pressing the first friction plate and the second friction plate against each other, the input member and the rotating member rotate relative to each other;

a second engaging device provided between the fixed portion and the rotating member and configured to switch between a rotatable state and a non-rotatable state of the rotating member with respect to the fixed portion;

an elastic biasing means provided between the rotating member and the first engaging device and configured to apply an elastic bias to the first friction plate and the second friction plate in a direction so as to be pressed against each other;

a pressing device provided between the fixed portion and the rotating member and configured to press the elastic biasing means in a direction to release the force of pressing the first friction plate and the second friction plate against each other;

a first bearing provided between the elastic biasing means and the pressing device;

a second bearing provided between the rotating member and the pressing device or the fixed portion; and a planetary speed reduction mechanism having a sun element, a ring element arranged around the sun element, a carrier arranged between the sun element and the ring element with regard to a radial direction, and planetary elements engaging with the sun element and the ring element so as to transmit torque and rotatably supported by the carrier;

the sun element connected to the input member or the rotating member so as to transmit torque, the carrier connected to one of the rotating member or the input member and the output member so as to transmit torque, and the ring element connected to the other of the rotating member or the input member and the output member so as to transmit torque.

2. The two-speed transmission according to claim 1, wherein, in a state in which the rotating member is not rotating with respect to the fixed portion, the pressing device presses the elastic biasing means in the direction to release the force of pressing the first friction plate and the second friction plate against each other.

3. The two-speed transmission according to claim 1, wherein the elastic biasing means has a pressing plate supported so as to displace in the axial direction with respect to the rotating member, and an elastic member provided between the rotating member and the pressing plate.

4. The two-speed transmission according to claim 1, comprising a preload applying means provided between the first bearing and the rotating member and configured to apply a preload in the axial direction to the first bearing.

5. The two-speed transmission according to claim 1, wherein the sun element is connected to the rotating member so as to transmit torque, the ring element is connected to the input member so as to transmit torque, and the carrier is connected to the output member so as to transmit torque.

6. The two-speed transmission according to claim 1, wherein the sun element is connected to the input member so as to transmit torque, the ring element is connected to the rotating member so as to transmit torque, and the carrier is connected to the output member so as to transmit torque.

7. The two-speed transmission according to claim 1, wherein the planetary elements include a first planetary element configured to engage with the sun element so as to transmit torque, and a second planetary element configured to engage with the ring element so as to transmit torque and to engage with the first planetary element so as to transmit torque.

8. The two-speed transmission according to claim 7, wherein the sun element is connected to the rotating member so as to transmit torque, the ring element is connected to the output member so as to transmit torque, and the carrier is connected to the input member so as to transmit torque.

9. The two-speed transmission according to claim 7, wherein the sun element is connected to the input member so as to transmit torque, the ring element is connected to the output member so as to transmit torque, and the carrier is connected to the rotating member so as to transmit torque.

10. The two-speed transmission according to claim 1, wherein the sun element is configured by a sun gear, the ring element is configured by a ring gear, and the planetary elements are configured by planetary gears.

* * * * *